(12) United States Patent
Hwang

(10) Patent No.: US 8,346,616 B2
(45) Date of Patent: Jan. 1, 2013

(54) SYSTEM AND METHOD FOR FUEL PRICE-PROTECTION

(76) Inventor: Young Hwang, Scarborough (CA)

( * ) Notice: Subject to any disclaimer, the term of this patent is extended or adjusted under 35 U.S.C. 154(b) by 345 days.

(21) Appl. No.: 12/675,203

(22) PCT Filed: Sep. 5, 2008

(86) PCT No.: PCT/CA2008/001565
§ 371 (c)(1),
(2), (4) Date: Feb. 25, 2010

(87) PCT Pub. No.: WO2009/030032
PCT Pub. Date: Mar. 12, 2009

(65) Prior Publication Data
US 2010/0306078 A1 Dec. 2, 2010

Related U.S. Application Data

(60) Provisional application No. 60/935,873, filed on Sep. 5, 2007.

(51) Int. Cl.
G06Q 30/00 (2012.01)

(52) U.S. Cl. .......... 705/26.1; 705/30; 705/35; 705/36 R; 705/37.4; 235/380; 235/381; 235/382; 235/493

(58) Field of Classification Search .................. 705/26.1, 705/30, 35, 36 R, 37, 4; 235/380, 381, 382, 235/493
See application file for complete search history.

(56) References Cited

U.S. PATENT DOCUMENTS

| | | |
|---|---|---|
| 8,065,191 B2 | 11/2011 | Senior |
| 2002/0029171 A1 | 3/2002 | Seniro |
| 2004/0260632 A1 | 12/2004 | Wanasek |
| 2007/0145126 A1 | 6/2007 | Erlank et al. |
| 2008/0015964 A1 * | 1/2008 | Shuster ...................... 705/36 R |
| 2008/0195432 A1 * | 8/2008 | Fell et al. ........................ 705/7 |
| 2008/0249916 A1 * | 10/2008 | Kirch et al. .................... 705/37 |
| 2008/0262892 A1 * | 10/2008 | Prager et al. ..................... 705/8 |

* cited by examiner

Primary Examiner — Yogesh C Garg
(74) Attorney, Agent, or Firm — Young Basile Hanlon & MacFarlane, P.C.; Denise M. Glassmeyer

(57) ABSTRACT

A fuel-price protection mechanism whereby customers may pre-purchase quantity-based amounts of fuel and retrieve said fuel at any participating fuel retailer. The quantity-based amounts of fuel are represented in the customers account as a quantity-based fuel credit. The fuel credits may be redeemed at a participating fuel retailer to obtain fuel. The fuel credits are associated with a customer's home geographical region or a customer's selected price class. A conversion mechanism will allow the customer to redeem fuel credits in a different geographical region or price class. Redemption within the home region or the customer selected price class can occur without conversion.

23 Claims, 21 Drawing Sheets

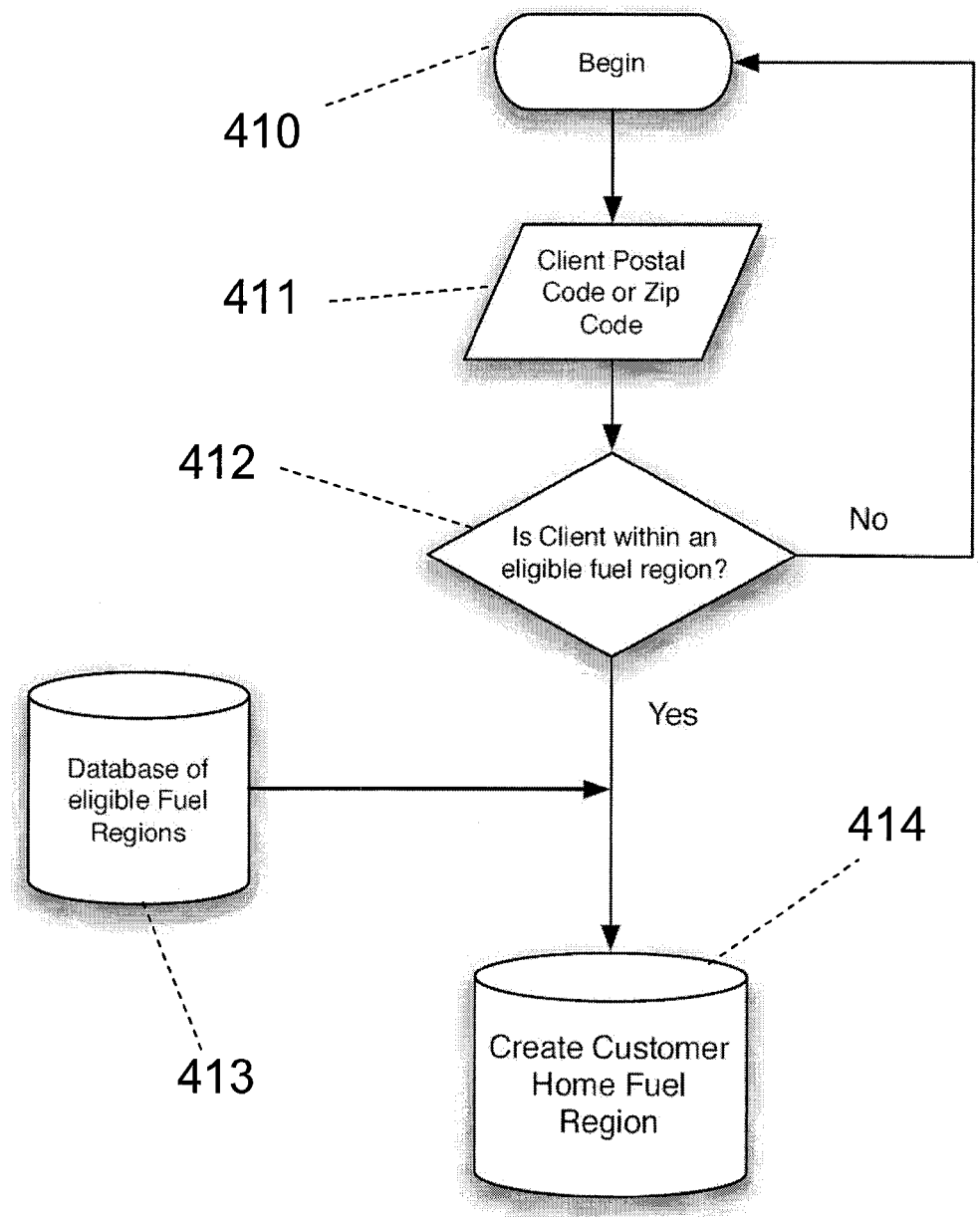

FIG 6b

Fuel Dispension is not available if one or more of the below are true

- Fuel Card is not recognized
- Customer account balance is insufficient
- Fuel pump is not recognized as an eligible participating retailer
- Fuel grade choice is not offered by participating retailer
- Customer's daily withdrawal limit has been exceeded

Fuel Dispension is permitted if ALL of the below are true

- Client and/or gift card is recognized
- Fuel grade, service station and eligible fuel region is recognized
- Client or gift card account balance is sufficient

SYSTEM AND METHOD FOR FUEL PRICE-PROTECTION

FIELD OF THE INVENTION

The present invention relates to a fuel price-protection system and a method for providing the same.

BACKGROUND OF THE INVENTION

Costs of purchasing fuel is a significant consideration for an owner of a vehicle and or a property. For example, large increases in gasoline prices have been shown to effect the frequency with which owners drive their cars, as well as effecting the type of cars that are purchased. As another example, home or building owners can switch between usage of hydroelectricity, natural gas or oil, depending on the relative prices of each fuel. Fuel prices are known to be subject to volatile pricing. Most fuels, including diesel, gasoline, hydrogen, ethanol, jet fuel, natural gas, and the like, have experienced periods of price volatility.

As fuel prices increase fuel producers and wholesalers typically benefit from greater profits, while fuel purchasers are disadvantaged by having to pay higher prices. Entities with large purchasing power and/or storage capacity may be able to "lock-in" a price for fuel or take delivery of a large quantity of fuel to protect against a rise in fuel costs. Typically, such entities will "lock-in" when the price of fuel drops and is expected to rise in the future. However, in the case of the average consumer purchasing from a retail outlet, even when fuel prices do dip and a future increase in prices is recognized or anticipated, there is little that the average consumer can do other than fill up the tank and hope that the prices stay low. The average consumer simply does not have a purchasing power or storage capacity to "lock-in" at a fixed price per unit quantity of a fuel. Therefore, the average consumer does not have an opportunity to manage the volatility of fuel prices so as to be protected from the disadvantages of rising fuel prices.

Several entities have attempted to provide a fuel priceprotection service to the average consumer.

First Fuel Banks, is a family run operation in a small town called St. Cloud Minnesota. They have offered their customers a price protection facility since 1982 available at any of their 6 retail locations. Although they are small, over 5% of the population in their region has a First Fuel account. However, their customers can only withdraw at their own stations. The physical nature of their offering prevents them from further geographic expansion.

Gulf Oil operates roughly 1100 stations in the US North-East, mostly in Maine and New Hampshire. They announced sometime last year that they will offer a price protection program available only at their franchised locations, but the protection will only last for 12 months. They have yet to launch this concept which appears to be delayed for reasons that remain unclear.

A Fort Meyers company called "Fuel Bank", may be launching a universal gasoline price-protection program in the fall of 2007 and have filed U.S. patent application Ser. No. 09/805,950 filed Mar. 15, 2001 (published as US2002/0029171) relating to this subject matter. However, their fuel credits will only last for 12 months and withdrawal will be extremely cumbersome. Customers will have to notify Fuel Bank via a web site with how much they want to withdraw and at which location they wish to pick it up. Then the customer will be mailed a voucher to be given to the station.

Several energy hedging companies exist that attempt to provide fuel solutions to mid-size fleets. The energy hedging company projects the fuel usage of the fleet over a specific time period. The fleet customer and the energy hedging company negotiate a flat-rate price for the projected fuel usage. Fuel is obtained at eligible pumps using a credit-card type payment system. At the end of the specified time period, the difference between projected fuel usage and actual fuel usage is determined, and the fleet customer is placed in either a credit or debit situation that must be resolved.

The above approaches suffer from a lack of flexibility and/or lack of convenience from the perspective of small to mid-size fuel consuming customers.

Therefore, there is still a need to develop a convenient fuel price protection system.

SUMMARY OF THE INVENTION

An object of an aspect of the present invention is to provide a fuel price-protection system or method that allows a customer the option to be protected from increasing fuel prices.

In accordance with an aspect of the present invention, there is provided a system for approving or denying customer requests to withdraw fuel from retail locations, comprising:
   a storage system configured to store:
      account records each comprising an unique account identifier, a credited fuel quantity, and a home geographical region; and
      price records each comprising an unique region identifier and a posted fuel price for the corresponding region;
   an interface configured to receive customer withdrawal requests via retail locations, wherein each withdrawal request comprises an account identifier and information for determining the geographical region of the retailer location;
   a processor configured to approve or deny each withdrawal request based on credited fuel quantity in the account record corresponding to the account identifier in the withdrawal request and any differential between the posted fuel price corresponding to the geographical region of the retailer and the posted fuel price corresponding to the home geographical region,
   wherein a withdrawal approval or denial is returned to the respective retail location in response to each withdrawal request.

In accordance with another aspect of the present invention, there is provided a method for providing a customer with fuel price-protection and enabling the customer to redeem a credited fuel quantity to obtain fuel at a retail location, the method comprising:
   establishing a posted price for a fuel type;
   charging the customer at the posted price for purchase of the credited fuel quantity;
   associating a unique identifier with the purchased fuel type, the credited fuel quantity, and the geographic region of the posted price;
   providing the identifier to the customer;
   receiving a withdrawal request via a retailer indicating use of the unique identifier in a transaction for redemption of the credited fuel quantity;
   determining the credited fuel quantity available for the transaction based on the geographical region of the retailer and/or the fuel type selected in the transaction;
   providing the retailer with a withdrawal approval based on the determined credited fuel quantity available for the transaction; and
   reimbursing the retailer for the cost of the transaction.

In accordance with still another aspect of the present invention, there is provided a method for providing a customer with fuel price-protection and enabling the customer to redeem a credited fuel quantity to obtain fuel at a retail location, the method comprising:

associating an unique identifier with a purchased fuel type, the credited fuel quantity, and the geographic region of the customer;

receiving data from a retailer indicating use of the identifier in a transaction for redemption of the credited fuel quantity;

determining the credited fuel quantity available to the customer based on the geographical region of the retailer and/or the fuel type selected in the transaction; and providing the retailer with a withdrawal approval.

In accordance with a further aspect of the present invention, there is provided a method for approving or denying a customer request to withdraw fuel from a retail location, comprising:

storing account records each comprising an unique account identifier, a credited fuel quantity, and a home geographical region;

storing price records each comprising an unique region identifier and a posted fuel price for the corresponding region;

receiving a customer withdrawal request via the retail location comprising an account identifier and information for determining the geographical region of the retailer location;

in response to the withdrawal request, returning one of a withdrawal approval and a withdrawal denial based on the credited fuel quantity in the account record corresponding to the received account identifier and any differential between the posted fuel price corresponding to the geographical region of the retailer and the posted fuel price corresponding to the home geographical region.

In accordance with an even further aspect of the present invention, there is provided a computer-based system for providing a customer with fuel price-protection and enabling the customer to redeem a credited fuel quantity to obtain fuel at a retail location, the system comprising:

a price module configured to establish a posted price for a fuel product in a customer's home geographic region;

a fuel credit purchase module configured to charge the customer for purchase of a credited fuel quantity at the posted price;

a storage system configured to associate an identifier with the purchased fuel type, the credited fuel quantity, and the home geographical region;

an interface configured to receive data from a retailer indicating use of the identifier in a transaction for redemption of the credited fuel quantity;

a processor configured to determine the credited fuel quantity available to the customer based on the geographical region of the retailer and/or the fuel type selected in the transaction and any differential between the posted fuel price corresponding to the geographical region of the retailer and the posted fuel price corresponding to the home geographical region;

an interface configured to provide the retailer with a withdrawal approval; and a reimbursement module configured to reimburse the retailer for the cost of the transaction.

In accordance with yet a further aspect of the present invention, there is provided a computer-based system for providing a customer with fuel price-protection and enabling the customer to redeem quantity-based fuel credits to obtain fuel at a retail location, the system comprising:

a storage system configured to associate an identifier with a purchased fuel type, the credited fuel quantity, and the home geographical region of the customer;

an interface configured to receive data from a retailer indicating use of the identifier in a transaction for redemption of the credited fuel quantity;

a processor configured to determine the credited fuel quantity available to the customer based on the geographical region of the retailer and/or the fuel type selected in the transaction and any differential between the posted fuel price corresponding to the geographical region of the retailer and the posted fuel price corresponding to the home geographical region;

an interface configured to provide the retailer with a withdrawal approval.

In accordance with another aspect of the present invention, there is provided a system for approving or denying customer requests to withdraw fuel from retail locations, comprising:

a storage system configured to store:
  account records each comprising an unique account identifier, a credited fuel quantity, and a price-centric class associated with the credited fuel quantity; and
  price records each comprising an unique price-centric class identifier and a posted fuel price for the corresponding price-centric class;

an interface configured to receive customer withdrawal requests via retail locations, wherein each withdrawal request comprises an account identifier and information for determining a price-centric class of the retailer location;

a processor configured to approve or deny each withdrawal request based on credited fuel quantity in the account record corresponding to the account identifier in the withdrawal request and any differential between the posted fuel price corresponding to the price-centric class of the retailer and the posted fuel price corresponding to the price-centric class associated with the credited fuel quantity, wherein a withdrawal approval or denial is returned to the respective retail location in response to each withdrawal request.

In accordance with still another aspect of the present invention, there is provided a method for approving or denying a customer request to withdraw fuel from a retail location, comprising:

storing account records each comprising an unique account identifier, a credited fuel quantity, and a price-centric class associated with the credited fuel quantity;

storing price records each comprising an unique price-centric class identifier and a posted fuel price for the corresponding price-centric class;

receiving a customer withdrawal request via the retail location comprising an account identifier and information for determining the price-centric class of the retailer location;

in response to the withdrawal request, returning one of a withdrawal approval and a withdrawal denial based on the credited fuel quantity in the account record corresponding to the received account identifier and any differential between the posted fuel price corresponding to the price-centric class of the retailer and the posted fuel price corresponding to the price-centric class associated with the credited fuel quantity.

In accordance with yet another aspect of the present invention, there is provided a computer readable medium embodying a computer program for providing a customer with fuel price-protection and enabling the customer to redeem a credited fuel quantity to obtain fuel at a retail location, the computer program comprising:

computer program code for establishing a posted price for a fuel type;

computer program code for charging the customer at the posted price for purchase of the credited fuel quantity;

computer program code for associating a unique identifier with the purchased fuel type, the credited fuel quantity, and the geographic region of the posted price;

computer program code for providing the identifier to the customer; computer program code for receiving a withdrawal request via a retailer indicating use of the unique identifier in a transaction for redemption of the credited fuel quantity;

computer program code for determining the credited fuel quantity available for the transaction based on the geographical region of the retailer and/or the fuel type selected in the transaction;

computer program code for providing the retailer with a withdrawal approval based on the determined credited fuel quantity available for the transaction; and computer program code for reimbursing the retailer for the cost of the transaction.

In accordance with a further aspect of the present invention, there is provided a computer readable medium embodying a computer program for providing a customer with fuel price-protection and enabling the customer to redeem a credited fuel quantity to obtain fuel at a retail location, the computer program comprising:

computer program code for associating an unique identifier with a purchased fuel type, the credited fuel quantity, and the geographic region of the customer;

computer program code for receiving data from a retailer indicating use of the identifier in a transaction for redemption of the credited fuel quantity;

computer program code for determining the credited fuel quantity available to the customer based on the geographical region of the retailer and/or the fuel type selected in the transaction; and computer program code for providing the retailer with a withdrawal approval.

In accordance with yet a further aspect of the present invention, there is provided a computer readable medium embodying a computer program for approving or denying a customer request to withdraw fuel from a retail location, the computer program comprising:

computer program code for storing account records each comprising an unique account identifier, a credited fuel quantity, and a home geographical region;

computer program code for storing price records each comprising an unique region identifier and a posted fuel price for the corresponding region;

computer program code for receiving a customer withdrawal request via the retail location comprising an account identifier and information for determining the geographical region of the retailer location;

computer program code for, in response to the withdrawal request, returning one of a withdrawal approval and a withdrawal denial based on the credited fuel quantity in the account record corresponding to the received account identifier and any differential between the posted fuel price corresponding to the geographical region of the retailer and the posted fuel price corresponding to the home geographical region.

In accordance with still a further aspect of the present invention, there is provided a computer readable medium embodying a computer program for approving or denying a customer request to withdraw fuel from a retail location, the computer program comprising:

computer program code for storing account records each comprising an unique account identifier, a credited fuel quantity, and a price-centric class associated with the credited fuel quantity;

computer program code for storing price records each comprising an unique price-centric class identifier and a posted fuel price for the corresponding price-centric class;

computer program code for receiving a customer withdrawal request via the retail location comprising an account identifier and information for determining the price-centric class of the retailer location;

computer program code for, in response to the withdrawal request, returning one of a withdrawal approval and a withdrawal denial based on the credited fuel quantity in the account record corresponding to the received account identifier and any differential between the posted fuel price corresponding to the price-centric class of the retailer and the posted fuel price corresponding to the price-centric class associated with the credited fuel quantity.

Novel features of these and other aspects will become apparent to those of skill in the art upon examination of the following detailed description of the invention. It should be understood, however, that the detailed description of the invention and the specific examples presented therein, are provided for illustration purposes only and are not meant to be limiting.

BRIEF DESCRIPTION OF THE DRAWINGS

The following drawings are illustrative only and are not meant to limit the scope of the claims:

FIG. 4a shows a block diagram describing an example of steps involved for determining the customer's home geographical region;

FIG. 6b is a block diagram showing examples of criteria that may be considered in determining whether the customer may proceed to redeem fuel credits and obtain fuel;

FIG. 9b shows a block diagram describing an example of steps involved in classifying eligible retailers within price-centric classes shown in FIG. 9a.

DETAILED DESCRIPTION OF PREFERRED EMBODIMENTS

Figure 1:
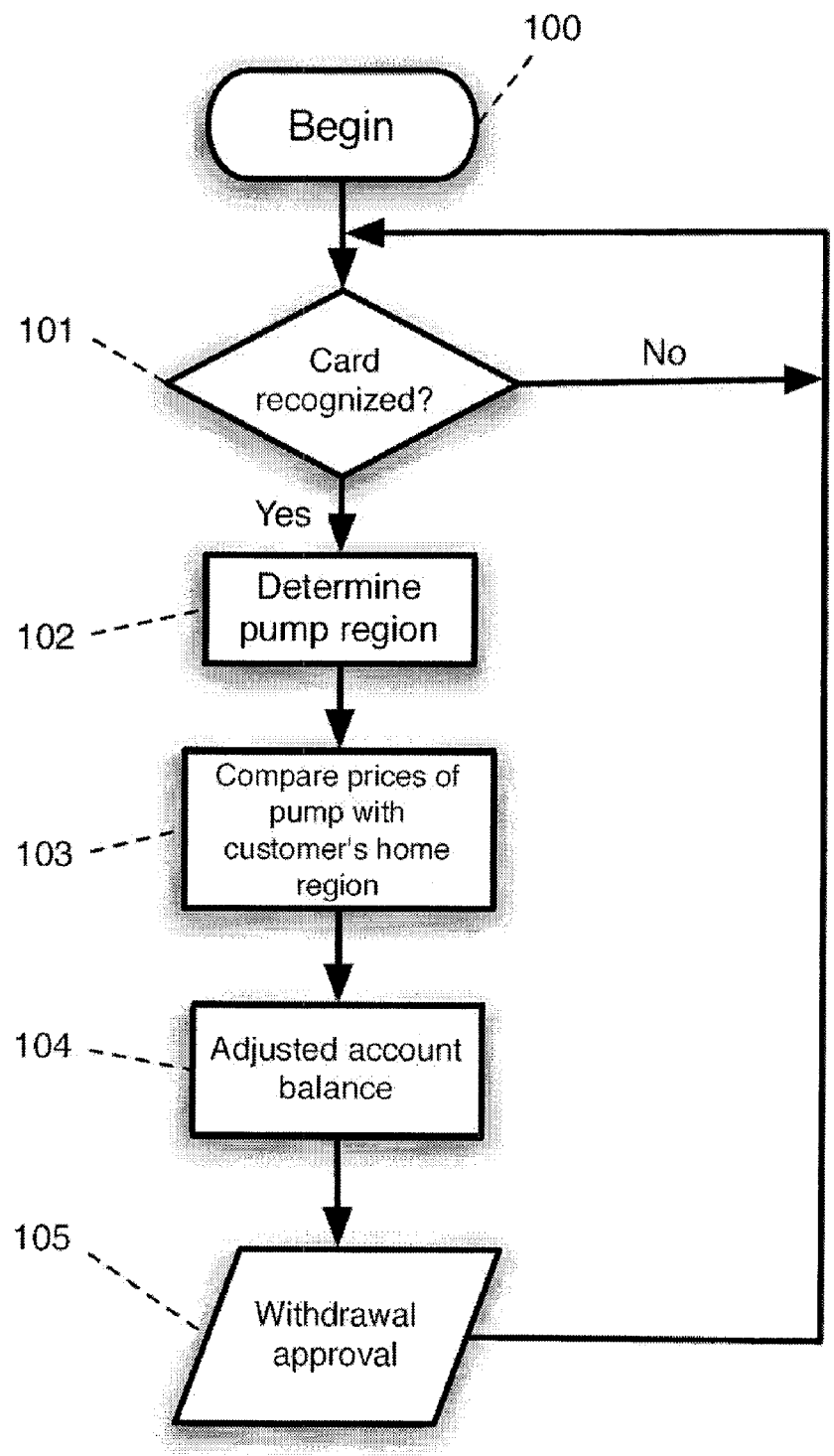
FIG. 1 shows a block diagram describing an example of steps involved when a motorist, using the fuel price-protection system, obtains fuel at a pump at a retail gas station.

A fuel price-protection system, or method for providing the same, that is based on purchasing quantity units (for example, gallons or liters) of fuel allows a customer to lock-in a price over the entire quantity purchased.

A typical customer may be any individual or entity that wishes to purchase quantity units of fuel credits for later redemption at a retail location, including an individual consumer, a company that manages a vehicle fleet, or a company that sells or leases vehicles and provides fuel credits to its customers as an incentive or wishes to bundle fuel credits with the sale or lease of vehicles.

The system allows the customer to lock-in any desired amount of fuel at a current posted price. Quantity-based fuel credits may be purchased on a website using a credit card or other form of payment. Purchases are credited to the customer's account which are held in quantity units and stored electronically on a host computer. The purchased fuel credits may be redeemed at retail locations that are connected to the electronically stored information of a customer account or an account linked to a card such as a membership card or a gift card. Account balances can be updated to reflect redemption of credits.

The system includes providing the customer with a unique account identifier. The identifier may be an electronic identifier such as a PIN number. The identifier may be a physical identifier such as a bar-coded key tag or bar-coded and/or magnetic striped card. The physical identifier may include a membership card, pre-paid card or gift card. This identifier allows the customer to redeem quantity-based fuel credits at a retail location. The customer's account is reduced by the amount of fuel withdrawn in the transaction and the fuel retailer is reimbursed the retailer's price for the fuel at the time of redemption.

The operator of the system assumes the risk of fuel price increases between a time of purchase of fuel credits and a time of redemption. This risk is mitigated by a risk management module that can involve, for example, investing capital in fuel contracts or futures or interest bearing instruments.

The system may allow for transfer of any desired amount of quantity-based fuel credits from a first registered customer to another, or transfer to an unregistered customer by means of a pre-paid card.

The system may include portability of fuel credits from a first geographic region to another geographic region, with amount of fuel credits in an account being converted to adjust for price variation in different geographical regions. The system may also include a converter for converting the amounts of quantity-based fuel credits to adjust for price differences between different fuels or different grades of fuels.

The system allows customers to purchase bulk quantity reserves of fuel at a current posted price and allows customers to lock-in at the posted price until redemption at a retail location connected to electronically stored account for a customer, with the account being adjusted to reflect the redemption.

FIG. 1 shows a block diagram describing an example of a motorist using the system and the general steps involved when the motorist fills up at a pump at a retail gas station. As the motorist swipes his/her fuel card (100), a data transmission from the station to a central hub will determine if the card is recognized as an eligible/valid customer (101). Then the service station code will be examined to identify in what region the service station is located (102). If recogni Customers may purchase fuel credits from any class and may hold fuel credits from multiple classes in their accounts. zed as the customers home region, then no adjustment to the account balance is required and the motorist may begin withdrawing a up to a pre-approved amount. If the station is located in a region other than the motorist's home region (103), then the client's account is temporarily adjusted to reflect the current fuel pump region as the client's new "home" region. After the adjustment is made, the new account balance is examined to create the withdrawal approval back to the service station (105).

Figure 1A:
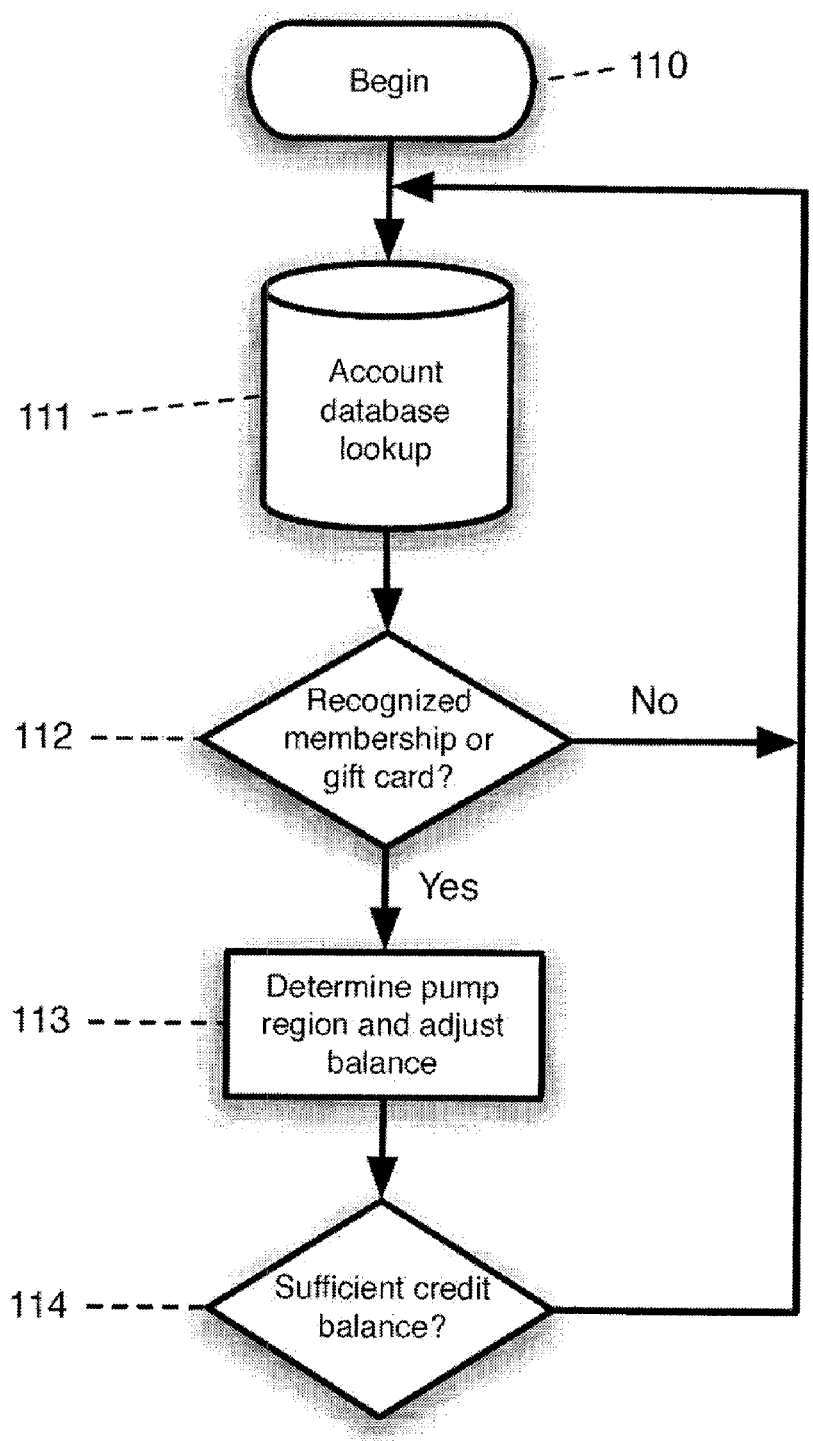
FIG. 1a shows a block diagram describing an example of the approval process shown in FIG. 1 when a facilitator/adjudicator (such as a fleet card provider) is used to determine account approval.

FIG. 1a shows a block diagram describing the approval process shown in FIG. 1 when a facilitator/adjudicator (such as a fleet card provider) is used to determine account approval. As the motorist swipes his/her fuel card, a data transmission from the station is sent to a facilitator/adjudicator for authorization to proceed with the transaction. The facilitator/adjudicator initiates (110) a search of central account database (111) maintained by the facilitator/adjudicator, in order to determine if the card is valid. Once the card is recognized (112) as being valid the facilitator/adjudicator proceeds, similar to steps described in FIG. 1, to determine the service station geographical and make adjustments to the account balance if the geographical region is not the customer's home region (113). If the account is found to hold sufficient fuel credits (114) then the facilitator/adjudicator provides authorization for the transaction to proceed.

Figure 1B:
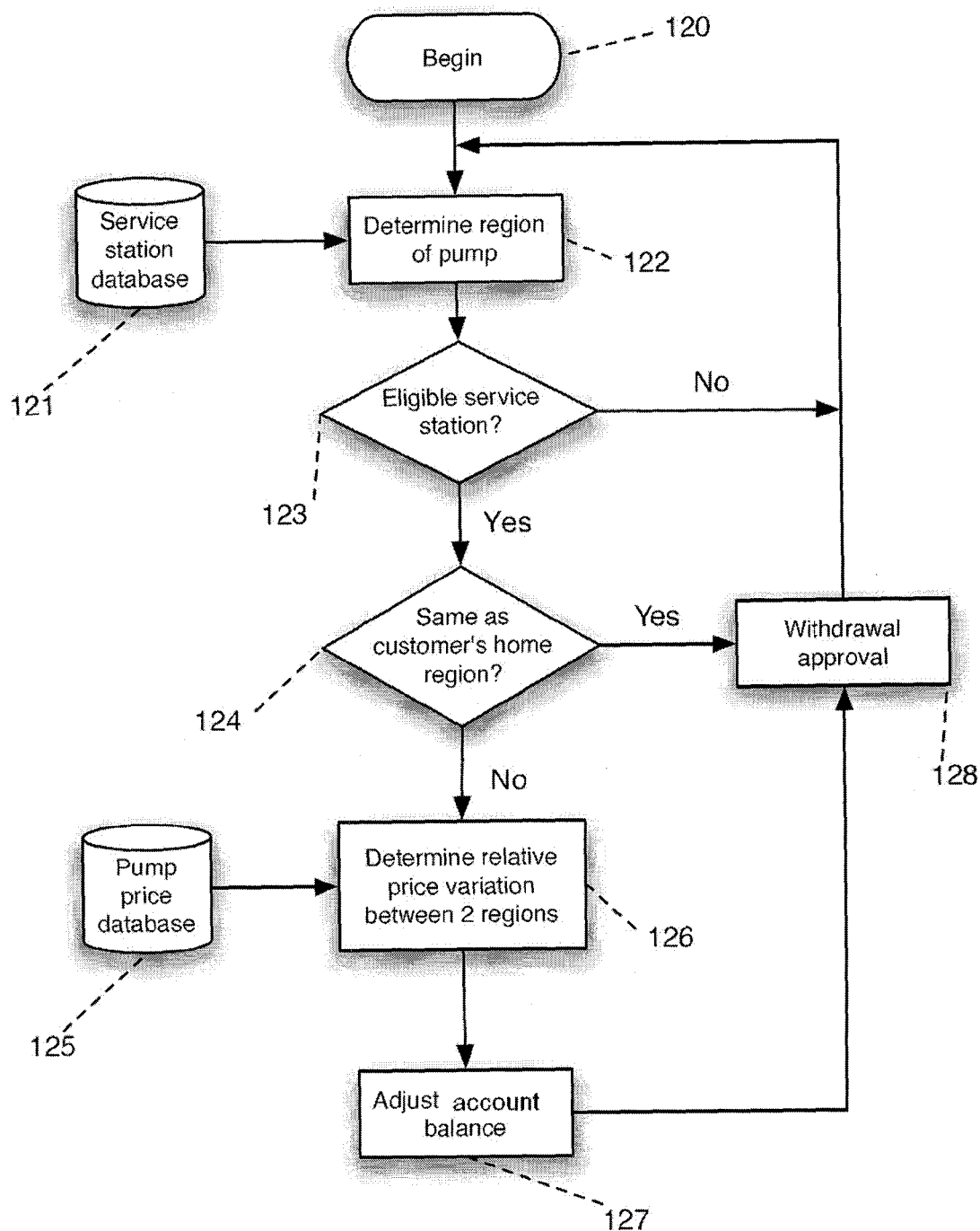
FIG. 1b shows a block diagram describing, in greater detail than in FIG. 1 or 1a, an example of steps involved in adjusting an account balance depending on the geographical region of the retail gas station.

FIG. 1b describes, in greater detail than in FIG. 1 or 1a, a step of adjusting an account balance depending on the geographical region of the retail gas station. A central database will maintain data of all eligible service stations (121) along with prices of posted rates in all fuel regions (125). The a database of price records for different eligible regions with each record comprising a unique region identifier and a posted fuel price for the corresponding region. Both data is required to accurately adjust account balances as a motorist drives out of his/her home region for a fill up. Once the fuel card is swiped and a data transmission from the station to a central account database is used to determine if the card is recognized as an eligible/valid customer as shown in FIG. 1

(101), then a determination of the geographical region of the retail station may be initiated (120). The data transmission from the station to a central hub can include a service station code that can be compared against the service station database (121) to determine the geographical region of the service station (122). If the service station code is found to represent an eligible service station (123) then the processing at the central hub will proceed to a comparison of the geographical region of the retail station with the customer's home region (124). If recognized as the customers home region, then no adjustment to the account balance is required and authorization for the transaction is granted (128). If the station is located in a region other than the motorist's home region, then the client's account is temporarily adjusted to reflect the current fuel pump region as the client's new "home" region. The pump price database (125) is maintained to contain the posted price for each eligible geographic region correlated with a unique region identifier such as a zip code, or any other classification systems, and this database can be accessed to compare the relative price variation (126) between the posted price of the customer's home region and the posted price of the geographical region of the service station on the day of redemption. Once the relative price variation is determined, the amount of quantity units of fuel credits available in the account is adjusted as a function of the determined price variation. After the adjustment is made, the new account balance is examined to create the withdrawal approval (128) back to the service station.

Figure 1C:
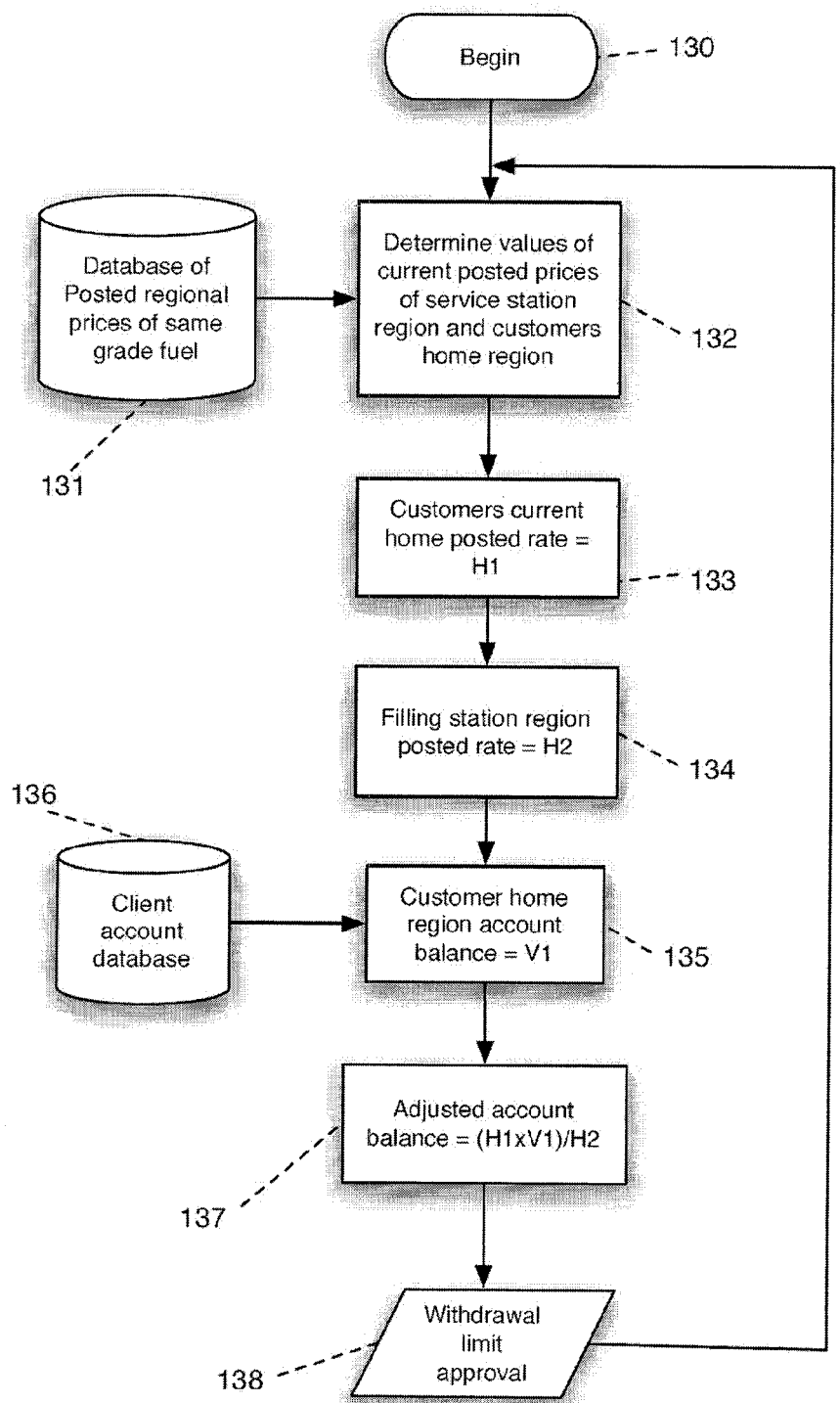
FIG. 1c shows a block diagram describing, in greater detail, an example of steps of determining relative price variation (126) and subsequent adjustment of account balance (127) that are shown in FIG. 1b.

FIG. 1c shows, in greater detail, the steps of determining relative price variation (126) and subsequent adjustment of account balance (127) that are shown in FIG. 1b. In particular, FIG. 1c shows the mathematical adjustments using current relative values of the posted rates in the customers home region and in the region where the motorist wishes to withdraw fuel. Once a determination has been made that the geographical region of the retail station where redemption is occurring is different than the customer's home region, a determination of price variation between the two regions may be initiated (130). A database (131) of current posted prices is maintained for the eligible geographic regions, and this database is accessed (132) to obtain the current posted prices for the two geographical regions, i.e. the customer's current home region posted price (133) and the retail station geographical region current posted price (134). A client account database (136) is also accessed to obtain the amount of quantity-based fuel credits held in the customer's home region account (135). The account balance is then adjusted as a function of the relative price differential between the two geographical regions (137). If a sufficient account balance exists, after adjustment, then withdrawal approval is granted (138).

A preset account balance limit for granting authorization for withdrawal may be set according to any desired criteria, for example average gas tank size or preset automated money limits at retail fuel dispensers. Simply for illustration, in one example a limit may be set for a retail customer to have at least 25 gallons or 100 L within that customer's account in order for a retail station to be sent a preauthorization for that customer to withdraw a volume up to that preset amount. However, if the customer has less than the above preset withdrawal limit, then the station will only be sent an authorization to dispense whatever balance is left (a volume less than the preset limit of 25 gallons, eg 4.5 gallons). Of course, the limit may be any other volume, for example more or less than 5, 10, 15, or 20 gallons, set by the operator as may be convenient. Given the preapproval (never sending a limit greater than the account balance), a retail dispenser can automatically shut off when the limit is reached. In the specific example, of retail gas stations, most stations now allow a money limit, for example $75, at which the machine automatically shuts off, and after which the customer must go see the attendant to pay for gas. For larger volume users, such as fleet companies, a modified system allowing for larger preset withdrawal limits will typically be established by the system operator.

Figure 1D:
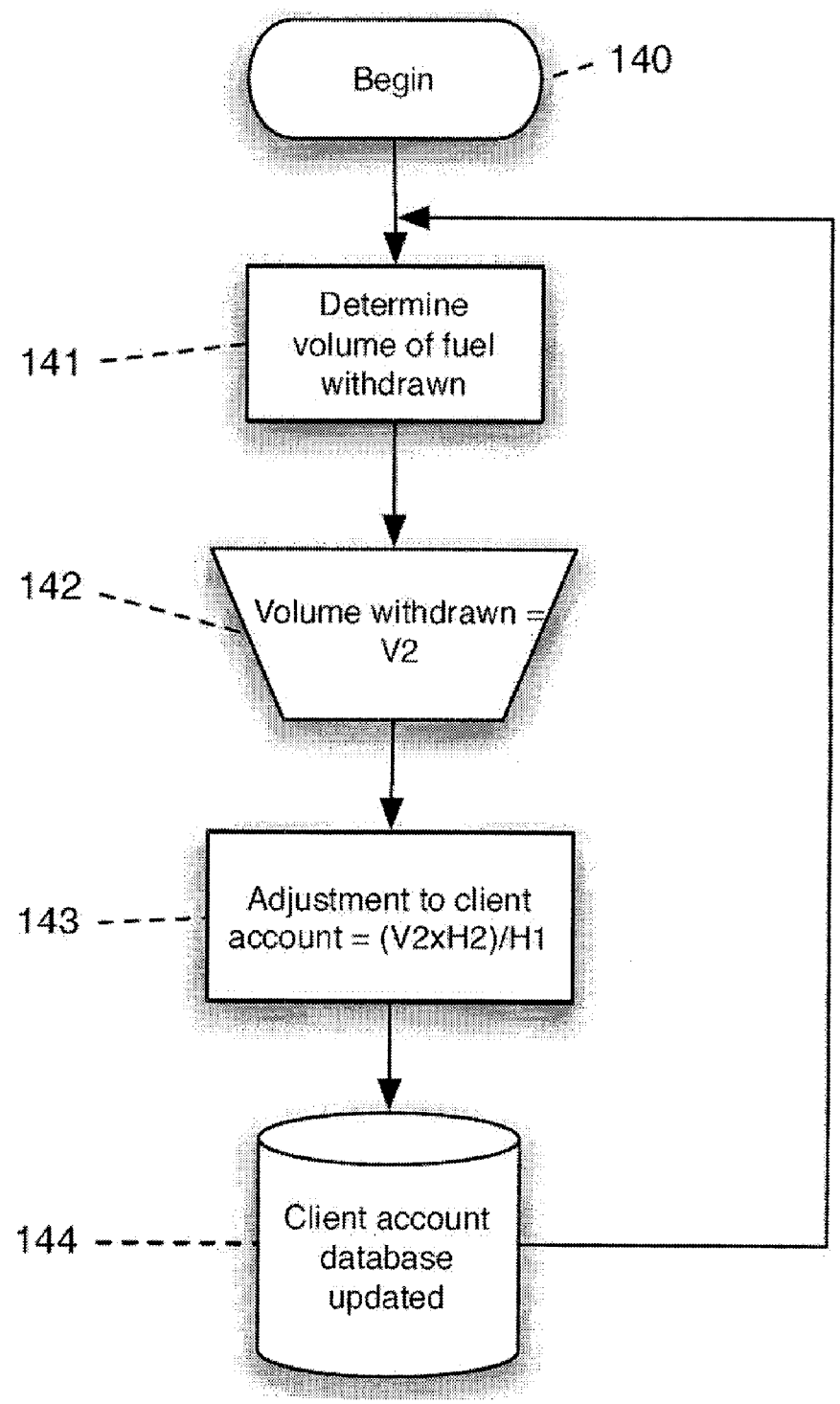
FIG. 1d shows a block diagram describing an example of steps involved in an adjustment to the customer's home account balance after the withdrawal volume is determined.

FIG. 1d shows the adjustment to the customer's home account balance after the withdrawal volume is determined. Once withdrawal approval is granted as shown, for example, in FIG. 1c, the customer can proceed to obtain a desired amount of fuel from the retail station (140). Once the customer has obtained the desired amount of fuel, the amount of fuel withdrawn from the retail station is determined (141) and is subtracted from the customer's adjusted account balance (as previously determined at block 137 in FIG. 1c) to yield a reduced number of quantity-based fuel credits (142) that reflects the draw down of quantity-based fuel credits that were redeemed at the retail station. The reduced number of credits is then adjusted (143) as a function of the relative price differential between the customer's home region and the geographical region of the retail station, and the customer account database is updated accordingly (144).

Figure 2:
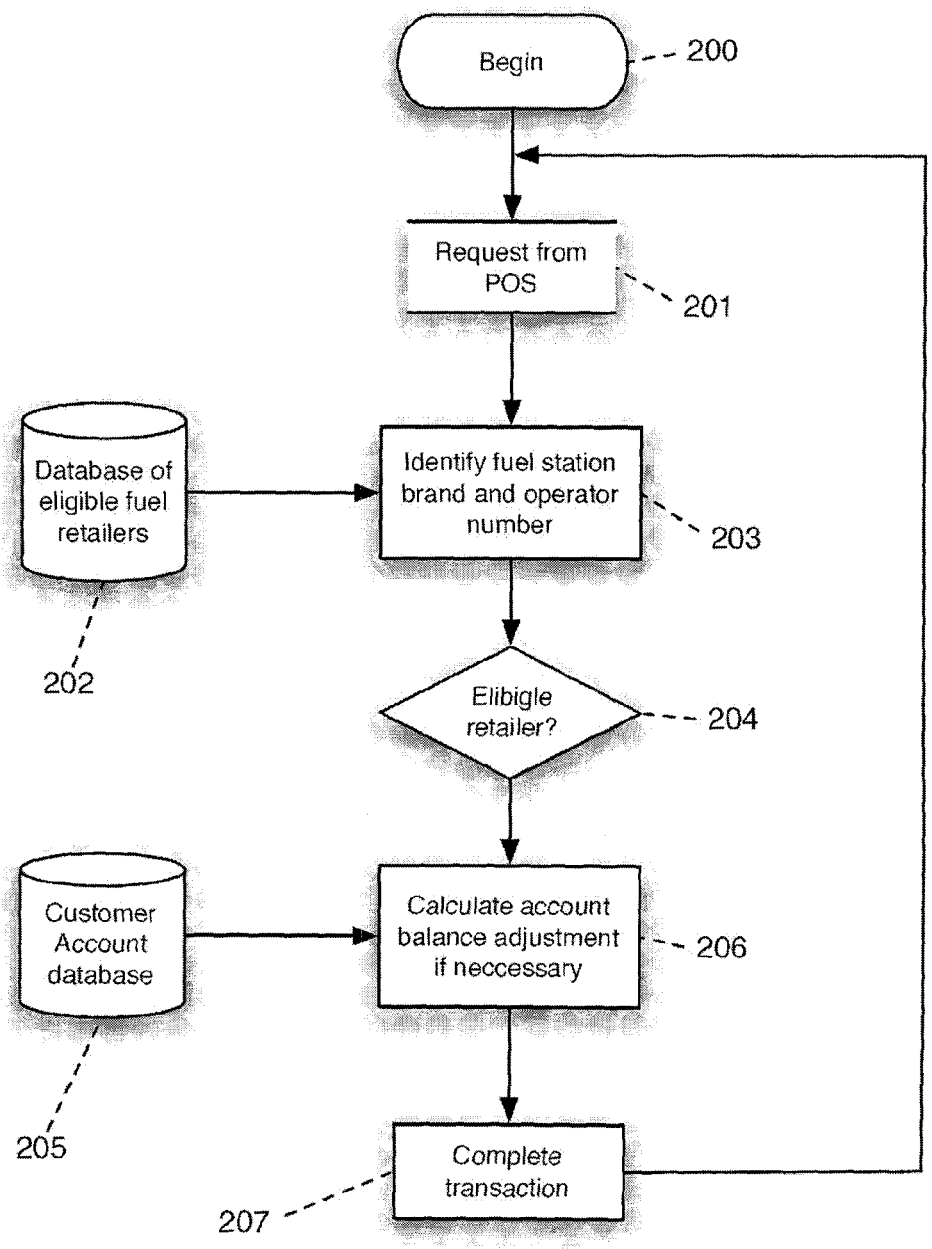
FIG. 2 shows a block diagram describing an example of steps involved when a motorist swipes a fuel card (or other device) at Point of Sale mechanism such as a card-swipe device at a gas station pump.

FIG. 2 shows a block diagram describing an example of general steps involved when a motorist swipes a fuel card (or other device) at Point of Sale mechanism such as a card-swipe device at a gas station pump. Once the motorist swipes a membership or pre-paid card (200) a data transmission is sent from a computer terminal at the point of sale (201) to a central host server. A database of eligible fuel retailers (202) is accessed to determine if the point of sale retailer is an eligible retailer (203). Once eligibility of the retailer is determined the process is allowed to continue (204) and the customer may be prompted for a numeric identifier (for example, a PIN number). If the numeric identifier is correct and corresponds to the card information provided at block 200, then the customer account database (205) is accessed, and steps of account balance adjustment (206) and withdrawal approval are followed as shown, for example, in FIGS. 1c. Once withdrawal is approved the customer can proceed to obtain a desired amount of fuel and complete the transaction (207). The customer account can then be updated to reflect the draw down of fuel credits as a result of the redemption of fuel credits at a gas station pump following the general steps shown, for example, in FIG. 1d.

Figure 3:
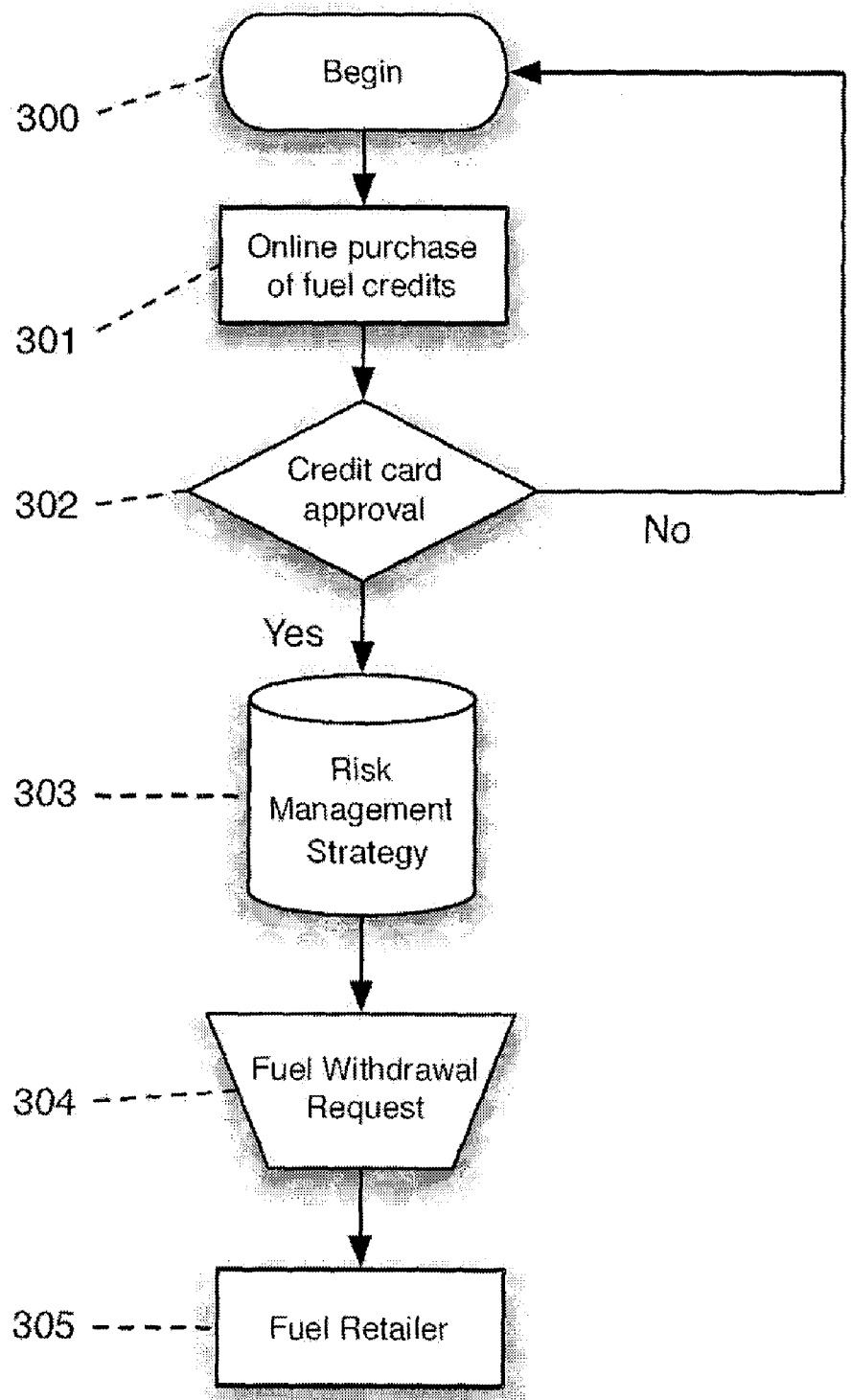
FIG. 3 shows a block diagram describing the general flow of funds in the price-protection system.

FIG. 3 shows the general flow of funds in the price-protection system. The customer may access (300) a website provided by the system. At the website the customer provides funds in exchange for quantity-based fuel credits (301). Once the payment of funds is approved (302), the purchased fuel credits are held in a customer account and the funds are invested in accordance with risk management strategies (303). The fuel credits may be held in the customer account for any desired duration as may be determined by the operator of the system.

Typically, fuel credits may be held for greater than one, two, three or more years without expiry. In certain examples, the fuel credits may be held without expiry. In another example, the term of fuel credits may be renewed by the customer before and/or after an expiry date. The fuel credits are held in the customer account and the funds are held in risk management instruments until a withdrawal request is received, for example, a withdrawal data transmission (304) received from a retail outlet Point of Sale device and a fuel transaction between the customer and the retailer is completed. Once the transaction is completed the price-protection system provides reimbursement of funds to the retailer. The price-protection system assumes the risk of increases in fuel prices between the time that the customer purchases fuel credits and provides funds to the system and the time of redemption when the retailer is reimbursed for fuel obtained by the custom. This risk is mitigated by the use of risk management financial instruments.

Basic examples of risk management strategies are described in US2007/0038553 filed Aug. 15, 2006. Typically, the risk management strategies will involve a combination of fuel contracts, futures, and interest bearing financial instruments. In one example, the risk management instruments will comprise a sophisticated array of financial structures that will act to effectively mimic the price at the retail gas pumps, for example structures involving RBOB (unleaded NY Harbor gasoline futures). Keeping in mind that futures contracts have clearly defined expiries, structures may be laid out to create a perpetual mirroring of pump prices. Thus allowing for no time limit of price protection.

Figure 4:
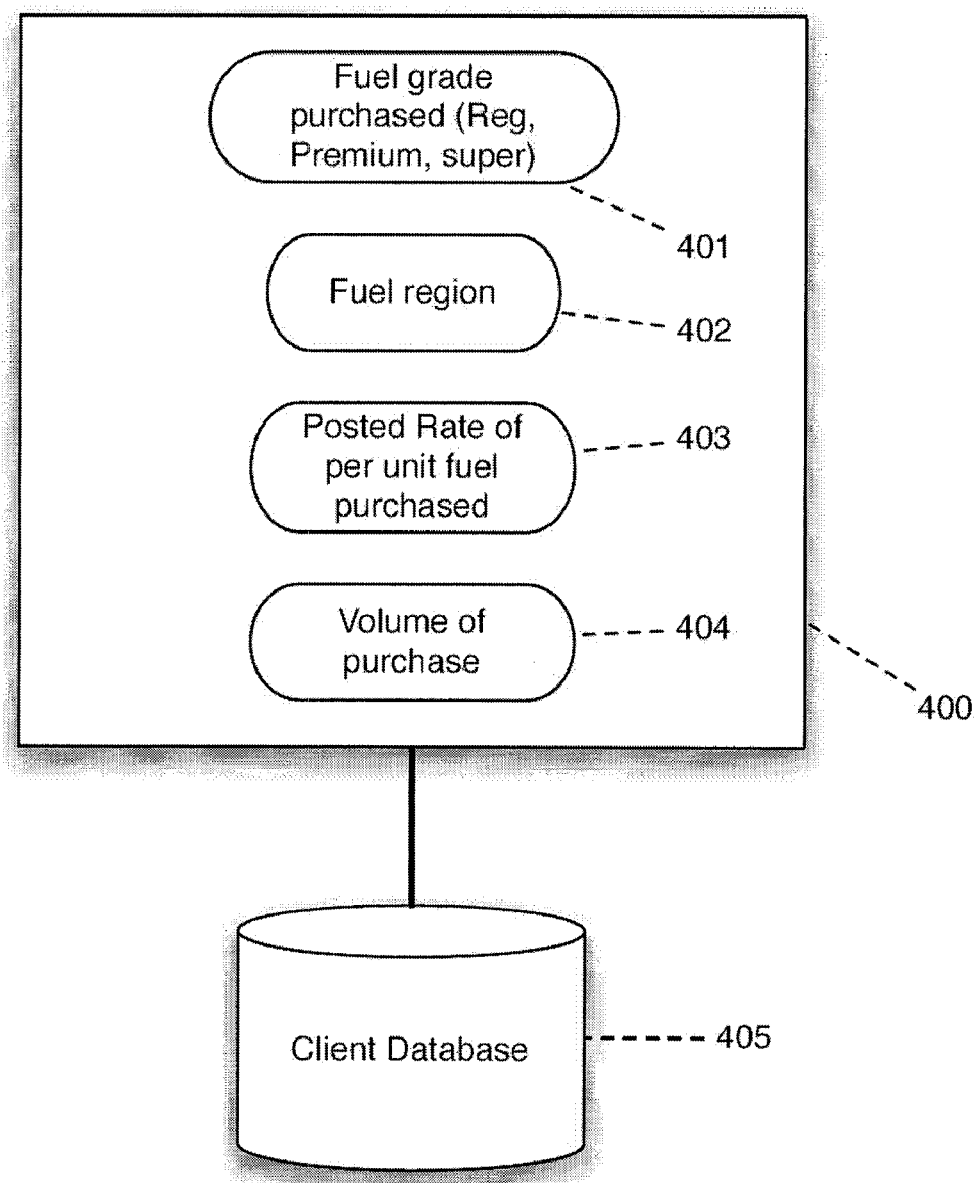
FIG. 4 shows an example of data fields that can be maintained in a customer account database.

FIG. 4 shows an example of data fields that can be maintained in a customer account database. When a customer purchases fuel credits for the first time an account may be created including the customer's personal contact information, payment information, security information, fuel credit information, or any other information or data that may be necessary or useful for future purchase of fuel credits. The customer account database is then maintained to keep an accurate record of data or information, for example the customer's home region, the amount of quantity-based fuel credits purchased, or the posted price at which the fuel credits were purchased. In the customer account database (405) shown in FIG. 4, only the fuel credit information data fields (400) are shown. The fuel credit information may include, for example, the fuel grade (401), the customer's home geographic region (402), the average posted rate per unit of quantity-based fuel credits remaining in the account balance (403), or the total amount of the quantity-based fuel credits held in the account (404).

FIG. 4a shows an example of a method for determining the customer's home geographical region. Once a customer submits a request (410) to purchase fuel credits the customer is prompted by the system to submit a zip code or postal code (411). A database of eligible fuel regions (413) and corresponding zip or postal codes is maintained within the system, and this database is accessed to determine (412) whether the submitted zip or postal code is in an eligible region. If the submitted zip or postal code is found within a database of eligible fuel regions, then the region correlated with the code is assigned as the customer's home geographic region (414). The boundaries of a zip code region may change over time. Thus, if zip or postal codes are used to establish a home region, then databases providing information on zip code boundaries or regions will be monitored for changes. Such databases include for example, the National Change of Address (NCOA-Link) Database provided by the US Postal Service, ZIP Code Boundaries Database developed by John Wehr, or ZIP Code Maps or Canadian FSA Maps provided by Zip-Codes.com.

Figure 5:
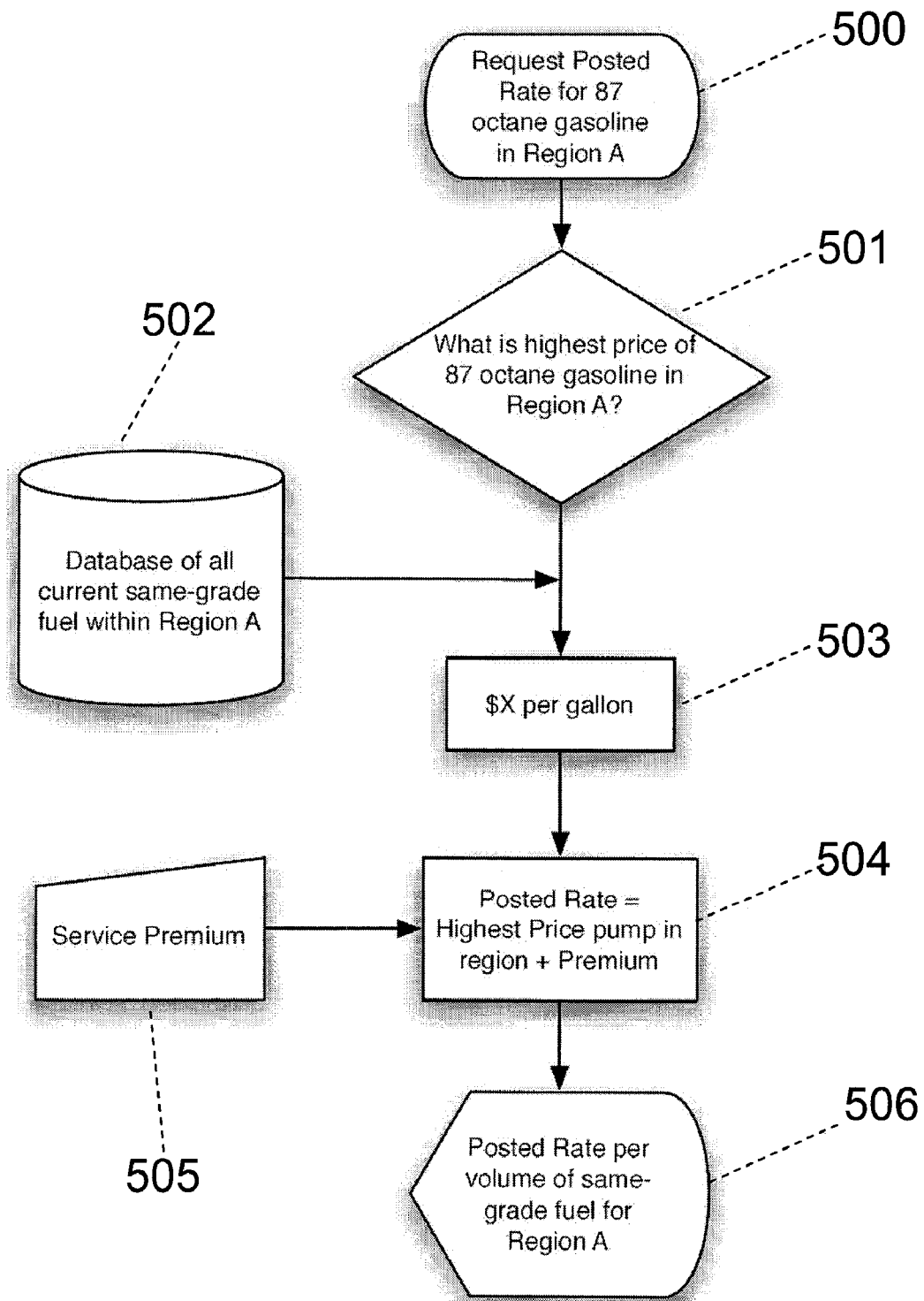
FIG. 5 shows a block diagram describing an example of steps involved to determine a posted rate for a geographical region.

FIG. 5 shows an example of general steps to determine a posted rate for a geographical region. A request (500) for a posted rate of a fuel in a geographic region may be made during or prior to purchase of fuel credits, or at any time simply for purchasing interest. Once a request is submitted, the highest price of the fuel in the geographic region is determined. A database (502) containing the various prices charged for the fuel in each geographical region is maintained, and this database can be accessed (501) to determine the highest price (503) of the fuel in a selected region. The posted rate (504) is then calculated as a function of the highest price (503) and a service premium (505). The service premium may be determined by any criteria as may be desired to mitigate risk of fuel price increases during the holding period of fuel credits, to generate up-front profit from sales of fuel credits, and the like. Once calculated, the posted rate may be presented (506) for viewing or further processing, for example in determining the cost of a fuel credit purchase.

Figure 6:
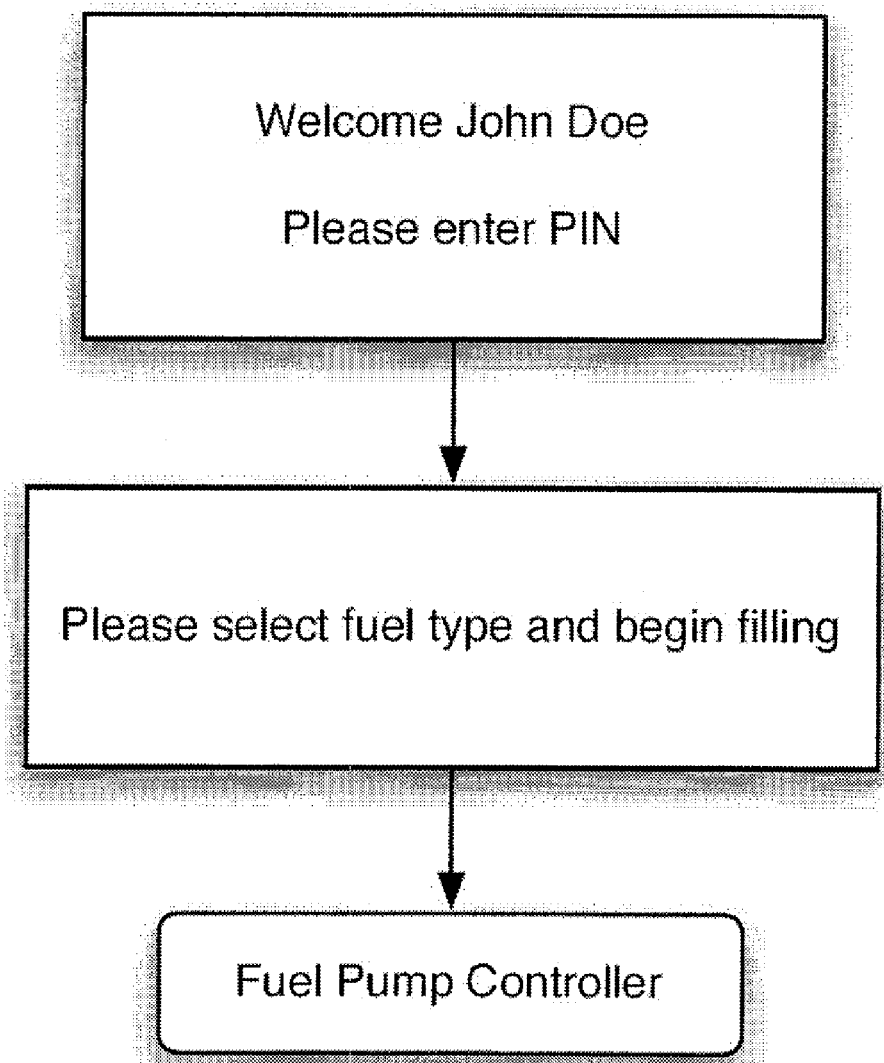
FIGS. 6 and 6a show examples of display visuals that may be used to guide the customer at a gas station pump.
Figure 6A:
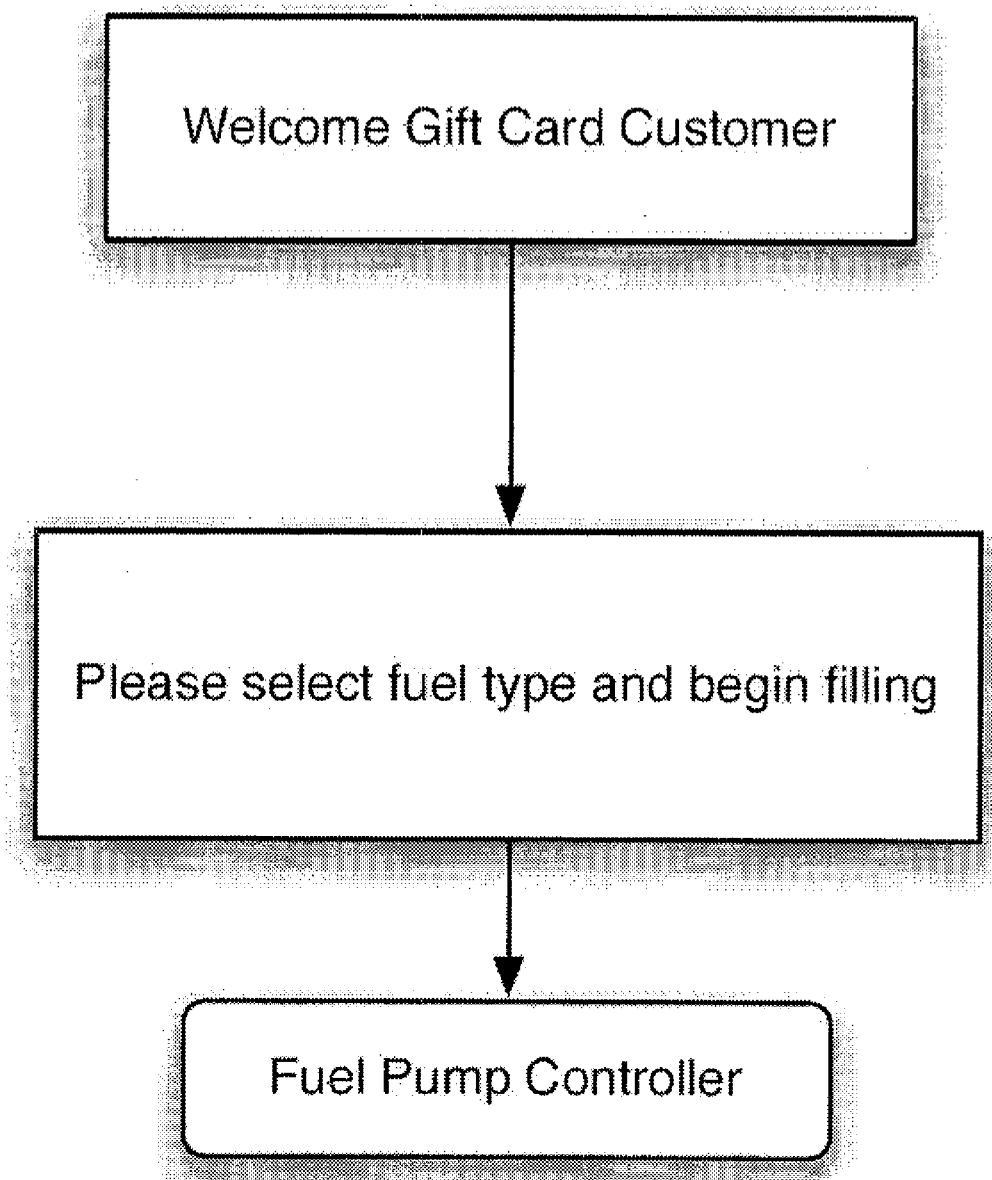

FIGS. 6 and 6a show examples of display visuals that may be used to guide the customer. FIG. 6 shows an example where a registered member customer has logged on using an identifier and is then prompted for a PIN identifier that has previously been supplied to this customer. FIG. 6a shows an example where a customer has swiped a pre-paid gift card and is allowed to proceed to selection of fuel type without being required to enter a PIN number.

FIG. 6b is a block diagram showing examples of criteria that may be considered in determining whether the customer may proceed to redeem fuel credits and obtain fuel.

Figure 7:
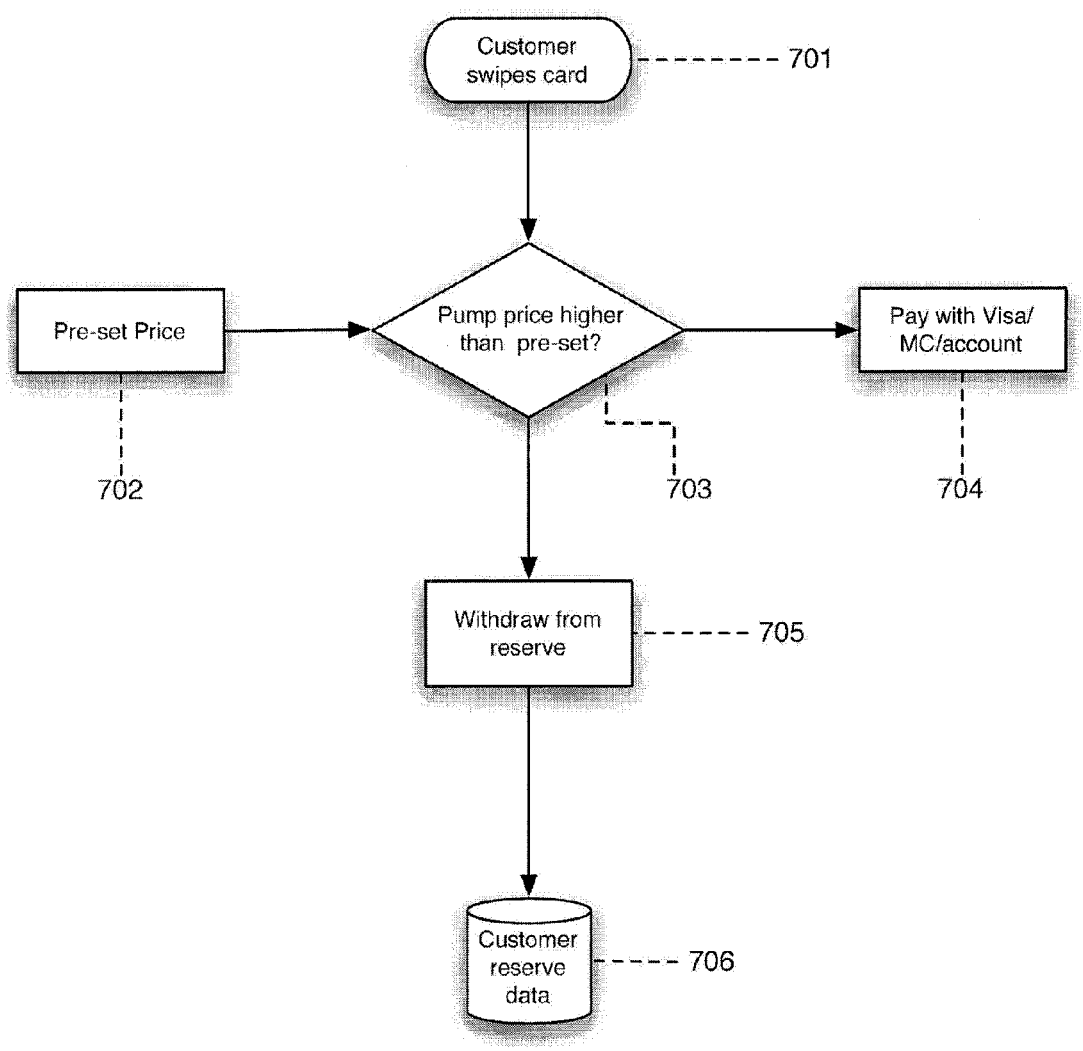
FIG. 7 shows a block diagram describing an example of steps involved in a price optimizer function used to determine whether a customer's fuel purchase should proceed by redemption of fuel credits or a secondary payment method.

FIG. 7 shows a block diagram describing an example of general steps involved in providing customers with a price optimizer function to optimize a customer's decision to redeem fuel credits. When a customer swipes a fuel card (or other device) at Point of Sale mechanism such as a card-swipe device at a gas station pump (701) a data transmission is sent from a computer terminal at the point of sale to a central host server. Once the customer's identifier (for example, card and/or numeric identifier) and eligibility of the retailer is verified as shown, for example, in FIGS. 1a and 2, then the customer account database may be accessed to obtain a pre-set price limit (702) to determine whether redemption of stored quantity-based fuel credits is advisable. The pre-set price limit may be established by the operator of the system or by the customer according to any convenient criteria, for example, highest, average, median, or lowest purchase price of the fuel credits in the customer's account. Alternatively, the customer may be given the choice to independently establish the pre-set price limit according to any desired criteria.

After obtaining the pre-set price limit from the customer account database, the pre-set price limit is compared against the price of the fuel chosen at the point of sale pump (703). This comparison determines whether the transaction should proceed on the basis of redemption of fuel credits in the customer's account. If the point of sale pump price is higher than the pre-set price limit then the transaction will proceed on the basis of a draw-down of fuel credits in the customer's account (705) and subsequent updating of the account to reflect the draw-down (706) as shown in more detail, for example, in FIGS. 1d and 2. However, if the point of sale pump price is not higher than the pre-set price limit, then the transaction proceeds on the basis of a secondary payment method (704), for example a credit card such as Visa or Mastercard, or a monthly billing account established for the customer by the operator of the fuel price-protection system.

The operator may allow the customer with an option of overriding the price-optimizer determination at the point of sale pump. As customer's will typically forget the purchase price of the fuel credits in their account, the price-optimizer is a convenient feature that can protect customers from executing an unprofitable redemption of fuel credits or to limit redemptions to a tolerable loss. Customer's may be willing to tolerate a loss upon redemption of fuel credits in order to redeem credits in advance of an expected expiry date and/or if the customer does not expect pump prices to achieve a level that would result in a profitable redemption. In such cases, the customer can set the pre-set price limit to reflect such expectations or may override the price-optimizer feature at the point of sale pump.

The fuel-price protection system may include portability of fuel credits from the customer's home region to another region, as described above, for example in FIGS. 1b and 1c. A customer purchases fuel credits according to posted rates in the customer's home region and may redeem the fuel credits in the home region as well as any other region. The customer's home region may be established according to a zip or postal code associated with the customer; for example, the customer's home region may be established on the basis of a zip or postal code region derived from IP address information or ISP information obtained during set-up or use of the customer account. Alternatively, the customer may provide a specific zip or postal code. However, a home region based on a single zip or postal code may not be convenient for a significant number of motorists that frequent point of sale pumps in geographically discontinuous zip or postal code regions. For example, customers that commute to work over a large distance, for example more than 60 miles, may equally frequent gas pumps near the customer residence and near the customer work place. For such customers a home region comprised of a plurality of geographically discontinuous regions may be advantageous. Alternatively, certain customers may frequent a limited number, such as one to five, point of sale pumps. For such customer's home region pricing on the basis of an entire zip or postal code may not be appropriate.

Figure 8:
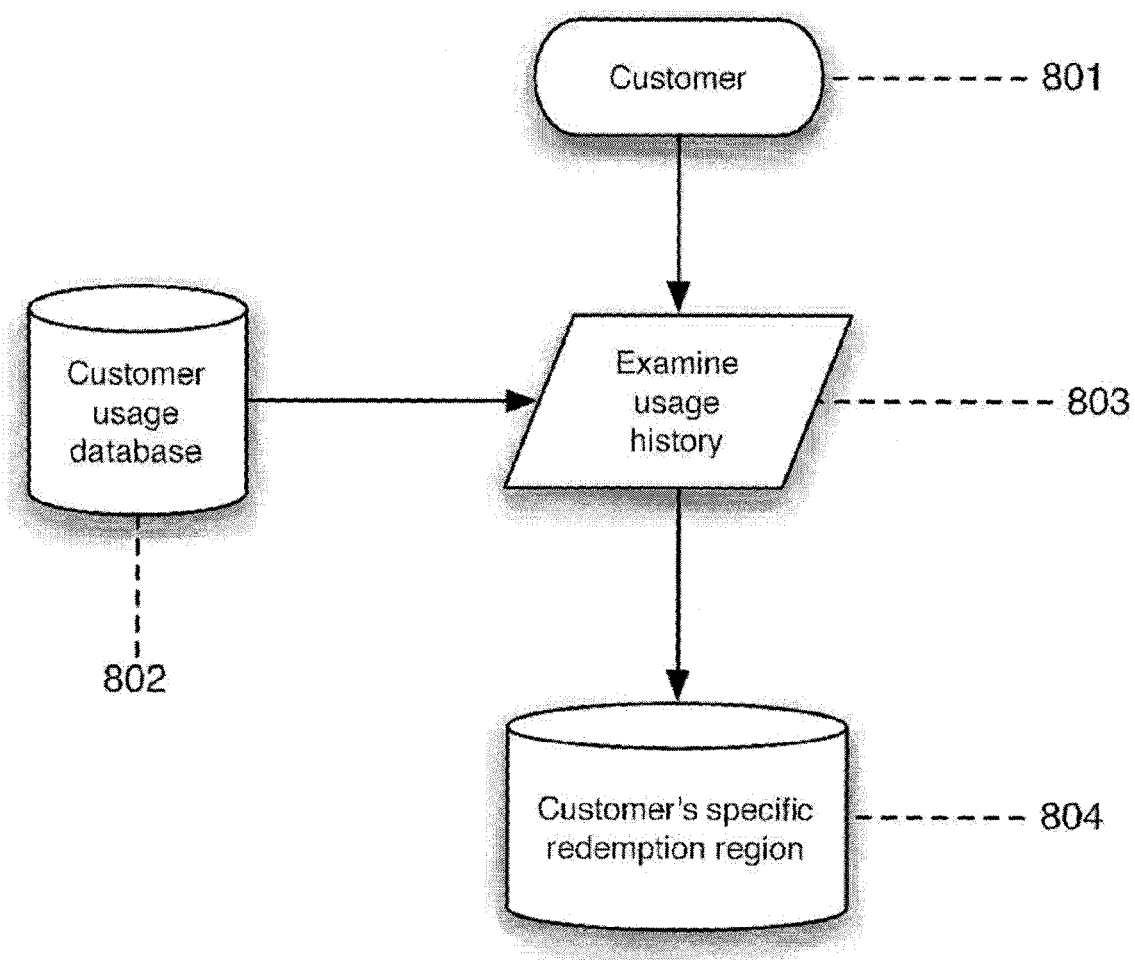
FIG. 8 shows a block diagram describing an example of steps involved for determining the customer's home region on the basis of the customer's fuel purchase history.
Figure 8A:
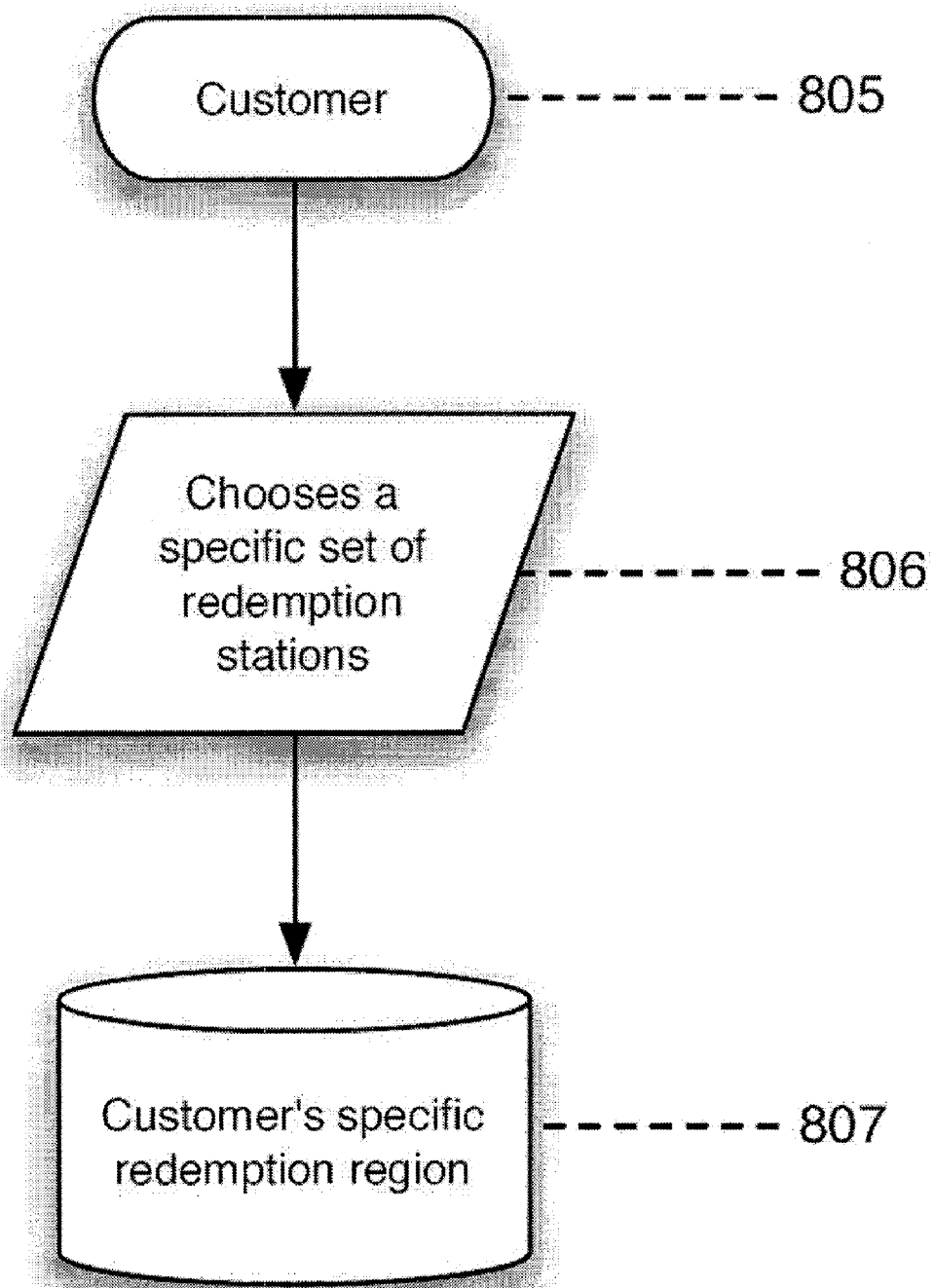
FIG. 8a shows a block diagram describing an example of steps involved for determining the customer's home region on the basis of specific eligible retailer(s) chosen by the customer.

FIGS. 8 and 8a provide examples of alternatives for establishing a customer's home region that, for a significant number of customers, may be more suitable than definition of a home region on the basis of a single zip or postal code. FIG. 8 shows the general steps involved in establishing a customer home region on the basis of the customer's usage or fuel purchasing history. Each time a customer redeems fuel credits, the purchase information may be recorded (801), for example point of sale location, time and/or quantity redeemed. The cumulative history of these redemptions may then be analyzed (803). With respect to a fleet customer the usage history may be known to the fleet card provider. For example, fleet card providers such as Wright Express, Voyager or Fleetcor possess data as to when and where their customers obtain fuel (802). Thus, the usage history data may be obtained from a database maintained by a fleet or other business customer or may be usage history recorded by the system itself or may be both. The usage history can be analyzed to determine a set of stations that constitute a suitable home region for the customer (804). For example, analysis of the usage history (803) may indicate that a majority of fuel is obtained at a select location or a select group of locations. This select group of fuel dispensing locations may then be established as the customer's home region. Customer can then redeem fuel credits at any of these home region locations without any need for a conversion taking place. If a redemption of fuel credits occurs outside of the home region group, then a conversion is applied. The operator of the system can establish the desired criteria for determining a home region in this manner. For example, a customer's redemption locations may be ranked in terms of the customer's frequency of visits, and the most frequently used locations that provide for at least 50%, 60%, 70% or more of fuel purchases by volume may be designated as the home region. The usage history and the redemption locations identified therein may be anayzed over any desired period of time, for example the last trailing month, or the last trailing year. In addition multiple analyses over multiple time windows may be performed to determine usage trends. The redemption locations may be within geographical proximity, such as within an area of 100 square miles, but geographically distant locations may also be grouped. This home region designation on the basis of usage history may be periodically updated, for example, daily, weekly, monthly, etc., as set by the operator or as requested by the customer.

FIG. 8a shows the general steps involved in establishing a customer specified home region. A customer (805) accesses the system via the internet or other electronic media and chooses (806) a specific set of locations for redeeming fuel credits. Any number of locations may be chosen as determined by the operator of the system. If desired by the customer a single location may be chosen if permitted by the operator. Location(s) may be chosen from a database of eligible retailers provided by the system. Alternatively, the customer enters the selected location addresses and the system then determines whether the selected locations correspond with elegible retailers by comparing each selection with an elegible retailer database. The home region is then determined on the basis of the customer choices that are elegible retailers. In this manner, the home region may not be restricted by geography and may consist of locations in different cities or even different states or provinces. For example, a customer who works in Los Angeles, but spends weekends in Manhattan may choose several elegible retailers in the Los Angeles and the New York City area, and a home region may be defined on this basis.

The steps shown in FIGS. 8 and 8a may be used in combination. For example, a customer specified home region may be established as shown in FIG. 8a upon a customer's initial use of the system or where the customer expects and may be able to predicat a change in the usage pattern, for example, due to change of residence or work, or due to purchase of a new vehicle that requires a different type of fuel than the customer's previous vehicles. The customer may proceed to use the system on the basis of the initial customer specified home region, and the usage history may then be periodically analyzed to modify or update the home region on the basis of the usage history. As another example of combining usage history and customer specified approaches to establishing a home region, each time a usage history home region is determined by the system, the customer may be given an option to review a list of point of sale locations that make up the home region. Upon review, the customer may be permitted to remove any locations from the list and/or may be permitted to add any eligible retailers to the list. Thus, the steps shown in FIGS. 8 and 8a, either alone or in combination, allow customers to be provided with a home region that need not be restricted to a single zip or postal code region. A home region established in this manner may comprise a plurality of discontinuous geographic regions, with the home region capable of containing point of sale locations found in a plurality of discontinuous zip or postal code regions.

Another approach to establishing a customer home region that need not be restricted to a single zip or postal code region is to establish a home region on the basis of a price class. Point of sale locations may be grouped according to current pump price or pump price ranges. In this approach elegible point of sale locations will require the ability to electronically transmit current fuel prices or any fuel price changes to a central database. Typically, the transmission of fuel prices or fuel price changes occurs in real-time. The information in the price database is used to establish and maintain a price-centric classification of eligible retailers.

Figure 9:
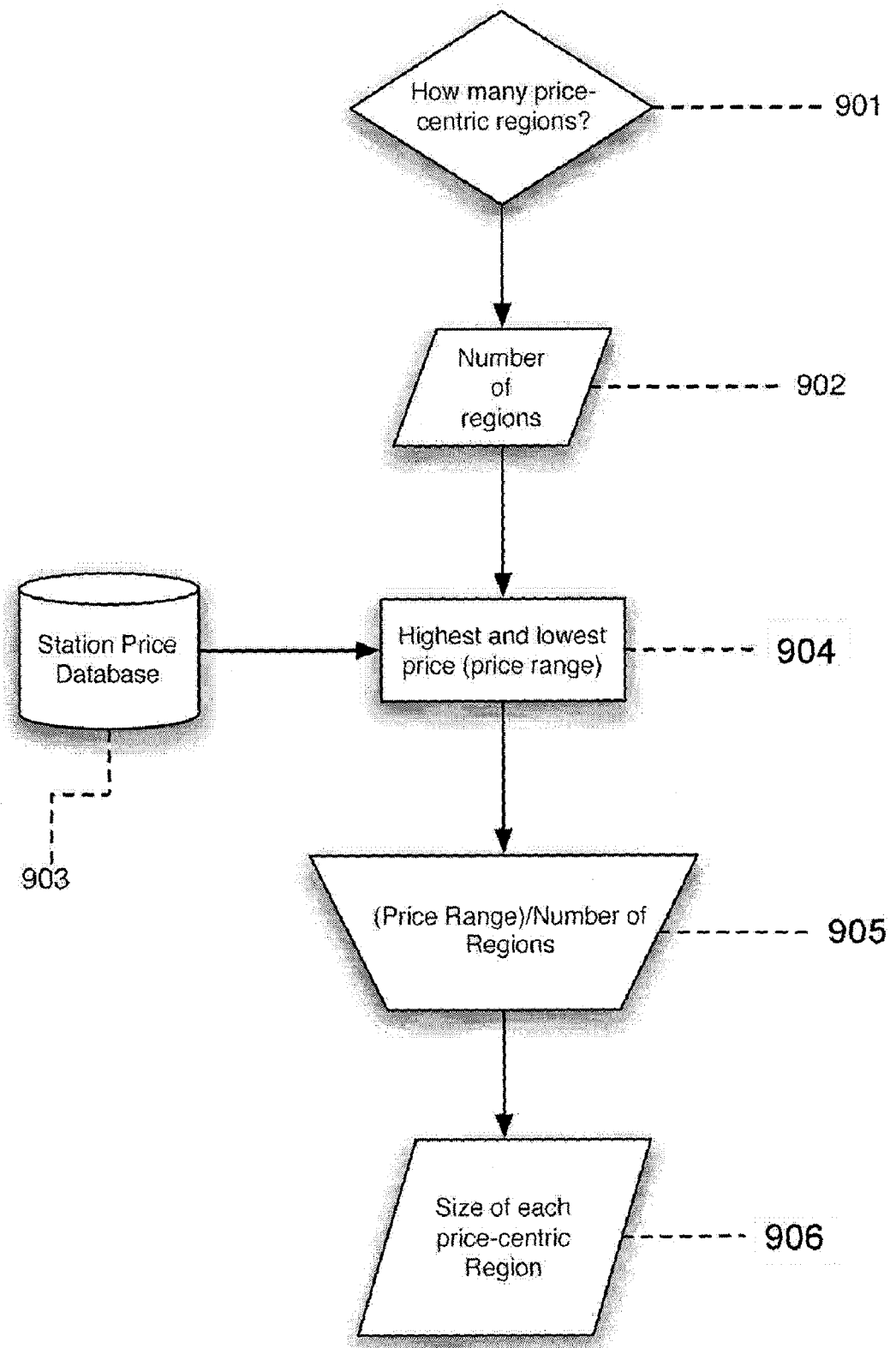
FIGS. 9 and 9a show block diagrams describing an example of steps involved for establishing and maintaining a price-centric class system for allowing convertability of fuel credits between different price classes.
Figure 9A:
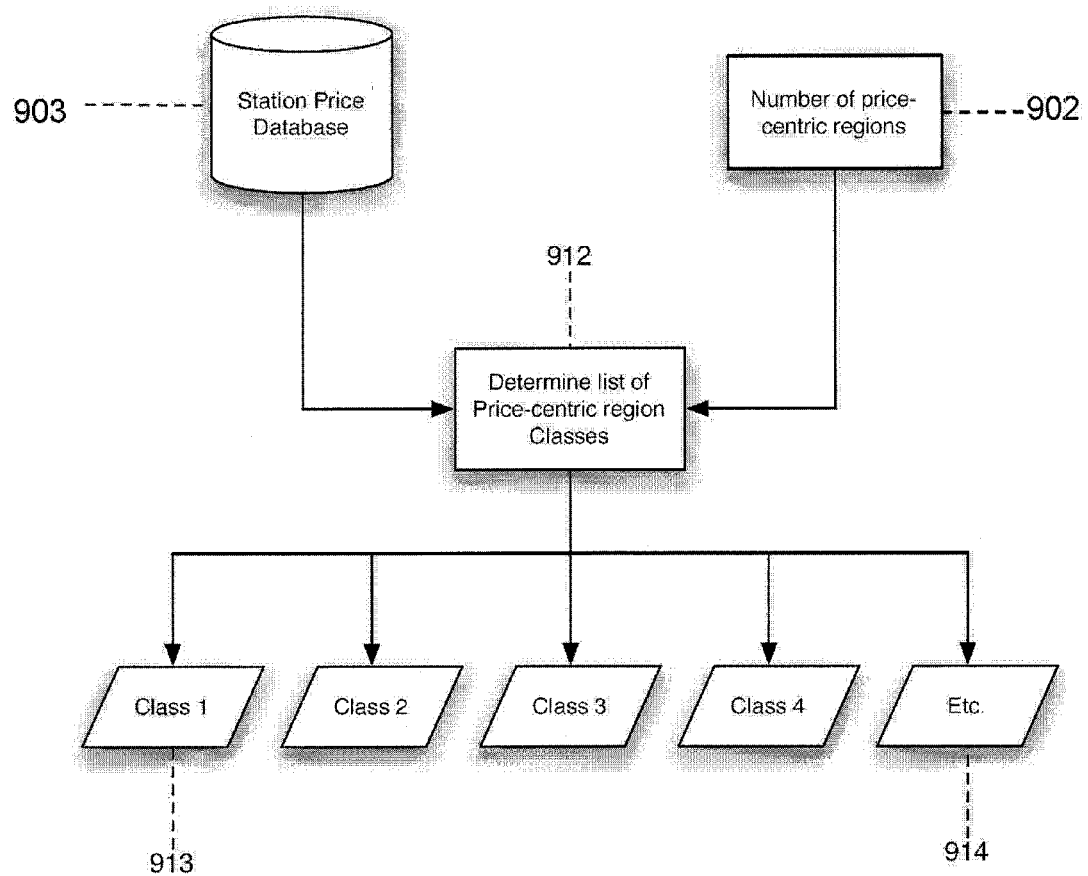

FIGS. 9 and 9a show general steps involved in establishing a price-centric classification. Initially, the number of price-centric regions is determined by the operator, and once the price-centric classification is established then the number of price-centric regions will typically be held constant by the operator. The number of price-centric regions can be determined as a function of the range of prices derived from a price database (903) containing pump prices of eligible retailers in a designated geographic area. The initial determination of the number of price-centric region will typically, be correlated with the size of the price range. Larger price ranges will have more price-centric regions than smaller price ranges. As one example, the number of price-centric regions can be determined on the basis of the absolute value of the price range; where the price range is divided by 20 cent segments. As another example, the number of price-centric regions can be determined on the basis of the percentage of the price range relative to a pump price. Dividing the price range by lowest pump price and multiplying the quotient by 100 provides a percentage of the price range relative to the lowest pump price. The number of price-centric regions may be based on such a percentage as illustrated in Table 1. Determination of price ranges and the number of price-centric regions may be filtered to eliminate clear outliers by known statistical methods. The number of price-centric regions can be determined by the operator according to any convenient criteria, but will typically be based on the difference between the highest and lowest pump prices in a designated area. The designated area may be a state/province, country or group of countries depending upon how large an area the operator wishes to service.

TABLE 1

| % price range relative to lowest pump price | Number of price-centric regions |
| --- | --- |
| >90% | 20 |
| 70-89% | 15 |
| 50-69% | 10 |
| 40-49% | 8 |
| 30-39% | 5 |
| 0-29% | 3 |

Once the number of price-centric regions is established (902), then the size and content of each price-centric region may be determined. The highest and lowest prices, eliminating outliers as desired, can be extracted from the price-database (903) with the difference between the highest and lowest price establishing the price range (904). Segmentation (905) of the price range (904) may be carried out by dividing the price range (904) by the number of regions (902) with the resultant quotient being used to establish the size of each price-centric region (906). The price range can thus be segmented into a desired number of equivalent sized price-centric regions with each price-centric region being designated as a price class (912). For convenience, the price-centric region representing the lowest segment of the price range may be designated as Class 1 (913) with higher segments of the price range being designated by sequentially higher Class numbers until the highest segment of the price range is reached (914).

A list of price-centric classes that together cover the price range (904) can be maintained in a price-centric classes database (922) and each eligible retailer from the price database (903) can be classified into an appropriate price-centric class (920, 921, 923). Thus, each class within the price-centric classes database (922) represents a segment of the price range (904) and may comprise a list of eligible retailers having pump prices that fall within each price range segment. The system may be updated according to one or more of the steps shown in FIGS. 9, 9a and 9b as frequently as desired by the operator of the system. However, typically the number of regions will be kept constant after its initial determination. For example, keeping the number of regions (902) constant, one or more of the price database (903), price range (904), size of each price-centric region (906), list of price-centric classes (912), and price-centric classes database may be updated in real-time, hourly, daily, weekly, or any period of time as desired by the operator of the system.

Figure 9B:
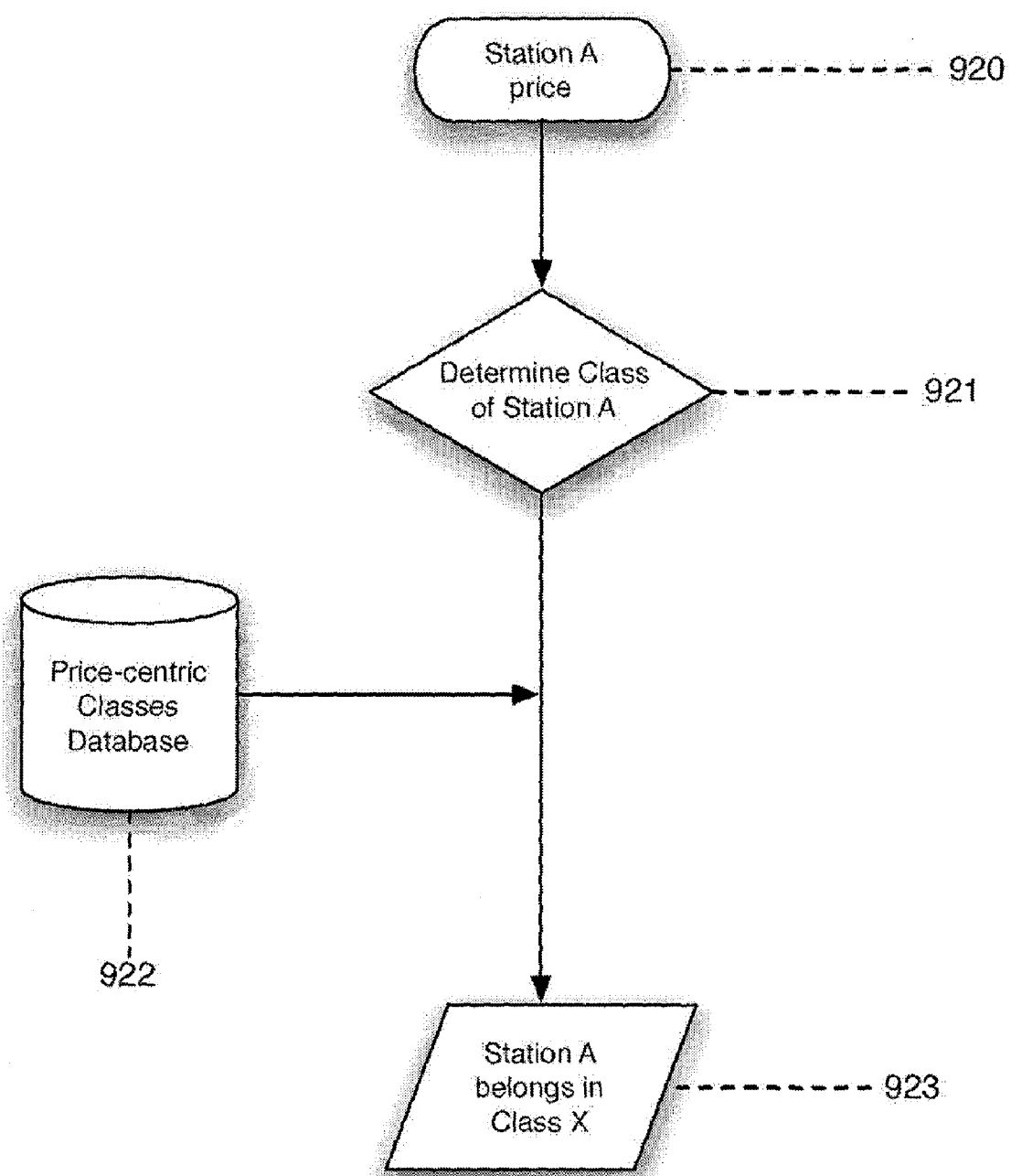

FIGS. 9, 9a and 9b illustrate one method of establishing price-centric regions or classes to allow convertability of fuel credits. Other methods of establishing price-centric regions will be recognized by the skilled person. For example, eligible retailers may be extracted from the price database (903) and may be ranked in a percentile arrangement (eg, each percentile representing $1/100$ of eligible retailers extracted from the price database) according to a sequential ordering of pump price. The percentile arrangement may be segmented into groups that contain an approximately equivalent number of percentiles, depending upon the pre-determined number of regions (902). Each segmented group, and the eligible retailers contained therein, represents a price-centric region with price limits of these price-centric regions being derived from the lowest and highest prices from within each group. If desired, outliers may be identified and eliminated at any step by known statistical methods.

The price-centric regions or classes may be represented geographically by plotting the eligible retailers contained within a region or class on a map of an entire area designated for operation of the system (eg, city, state, country, or continent). The system may update the price-centric region and its corresponding geographical respresentation at any frequency determined by the operator of the system.

When the number of regions (902) is held constant, updating of the price-centric regions will typically result in a change in the parameters of the price-centric regions, for example a change in the price limits of each price-centric region and/or a change in eligible retailers that are contained within each price-centric region. As the number of price-centric regions are held constant and represented by a Class number, the price class in which fuel credits were purchased can be correlated during updates of price-centric regions on the basis of Class number. For example, fuel credits purchased in price Class 2 will remain Class 2 fuel credits despite possible changes in price limits of Class 2 and eligible retailers contained within Class 2 as a result of an update carried out by the system. As such, over time and due to fluctuation in pricing, the price limits and other parameters of Class 2 may be very different, and even non-overlapping, at the time of redemption compared to the time of purchase of fuel credits.

A posted price of a class may be set by a premium above the median, average, or highest price within a class or by other similar methods as desired by the operator of the system. Customers may purchase fuel credits from any class and may hold fuel credits from multiple classes in their accounts. At the time of redemption, the customer can purchase fuel, without conversion, within the same class in accordance with the parameters of the updated version of the class. A conversion will be applied for purchase of fuel in a different class. The conversion may be carried out in a similar manner as described above, for example in FIG. 1c, with the current home class posted rate being multiplied by the number of fuel credits available in the home class and divided by the current posted rate of the different class resulting in the number of fuel credits available for use in the different class.

When fuel credits in multiple classes are held in a customer account and fuel is being purchased in a different fuel class, then a conversion may be applied in respect of each fuel credit class held in the account to determine the total fuel credits available in the different class.

A usage history database and analyzer may be provided to determine the price-centric class for the customer that would be expected to minimize the need for conversion at the time of redemption. A price optimizer feature such as described in FIG. 7 may be applied during redemption of fuel credits based on a price-centric classification. Where fuel credits are held in multiple price-centric classes, a pre-set price limit may be established for each respective class.

Selection of an appropriate home region or home class for each customer is an important feature of the system, as it may minimize time required for approval of conversions and any associated conversion charges that may be applied.

Figure 10:
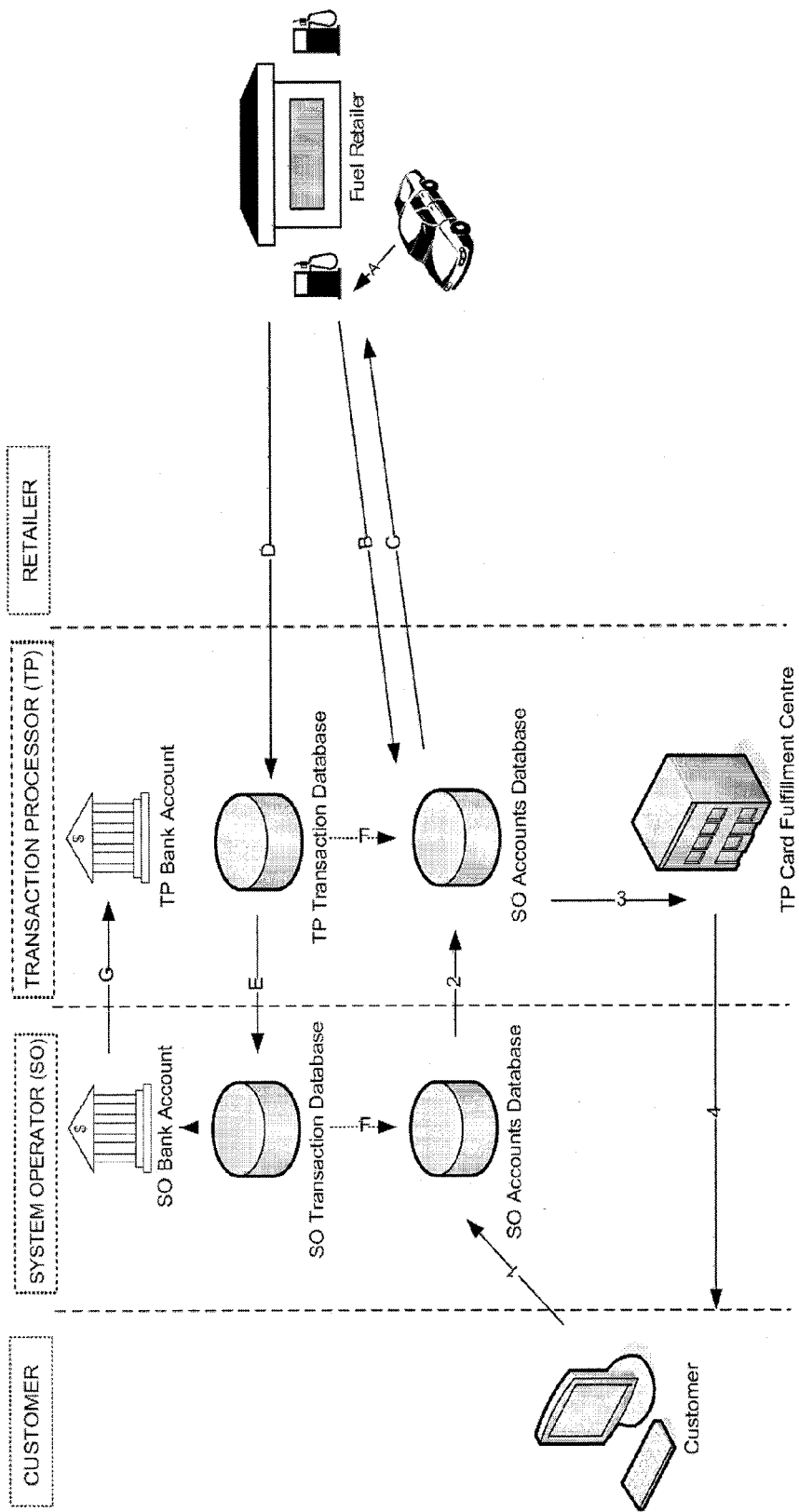
FIG. 10 shows a diagram representing transaction and data flow in an example of a fuel price protection system that incorporates a transaction facilitator/processor.

FIG. 10 shows an example of a fuel-price protection in use. FIG. 10 shows a mirrored storage system controlled by a system operator (SO) and a transaction facilitator/processor (TP). However, the entire system shown in FIG. 10 could be consolidated and readily operated or controlled by a single entity, such as a large oil company with retail locations. The numbered arrows (1 to 4) represent data flow at the time of purchasing a credited fuel quantity, while the lettered arrows (A to G) represent data flow at the time of redemption of a credited fuel quantity.

To purchase a credited fuel quantity the customer can purchase fuel credits from a website hosted by the SO. The SO accounts database is accessed (arrow 1). If the customer does not have an account in the SO accounts database then a new account is created with the credited fuel quantity. If the customer has an existing account in the SO accounts database then the customer account balance is updated to reflect the purchased credited fuel quantity. The SO accounts database holds customer account records where each record can comprise an unique identifier associated with the customer account, a customer's current credited fuel quantity, a customer's home geographical region, a customer's home price class or price class associated with a credited fuel quantity, a customer's pre-set price limit for controlling redemption of the credited fuel quantity, etc.

A processor controlled by the SO accesses (arrow 2) a storage system held by the TP and containing a mirrored SO accounts database. The SO accounts database contained in the TP storage system is updated to create a new customer account (if necessary) and to reflect the customer's purchased credited fuel quantity.

If a new customer account is created then the TP is notified (arrow 3) to create a new swipe card that will be recognized by the system as the unique identifier that is associated with the customer's account. The TP sends (arrow 4) a new card to the customer.

When a customer withdraws fuel from a retail location, the customer may choose to redeem a credited fuel quantity. The customer swipes (arrow A) the fuel card at a card swipe reader provided at the fuel pump.

The TP is contacted and requested for approval (arrow B) to proceed with a withdrawal of fuel from the retail location. An interface controlled by the TP is configured to receive the customer withdrawal requests via retail locations, wherein each withdrawal request comprises an account identifier and information for determining the geographical region of the retailer location. The request can be relayed (not shown) to the SO and monitored and acted upon at the SO location.

The SO accounts database is accessed to determine approval or denial of the request. Furthermore, a storage system configured to store price records (not shown) each comprising an unique region identifier and a posted fuel price for the corresponding region is also accessed.

The system at the TP and/or the SO sites will have a processor configured to approve or deny each withdrawal request based on credited fuel quantity in the account record corresponding to the account identifier in the withdrawal request and any differential between the posted fuel price corresponding to the geographical region of the retailer and the posted fuel price corresponding to the home geographical region.

A withdrawal approval or denial is returned by the TP to the respective retail location in response to each withdrawal request (arrow C).

If the withdrawal is approved, then the customer proceeds with fuel withdrawal, the transaction is completed and a transaction record is sent to the TP (arrow D) and a TP storage system (shown as a database) holding transaction records is updated.

The transaction record is relayed (arrow E) to the SO, and an SO storage system (shown as a database) holding transaction records is also updated.

The SO accounts databases at both the SO and TP are then updated (arrow F) to reduce the credited fuel quantity, based on the quantity of withdrawn fuel indicated in the transaction record.

The SO may then send (arrow G) funds to cover the transaction to the TP. The TP may send funds (not shown) to reimburse the retailer at any point after it receives the transaction record.

Figure 11:
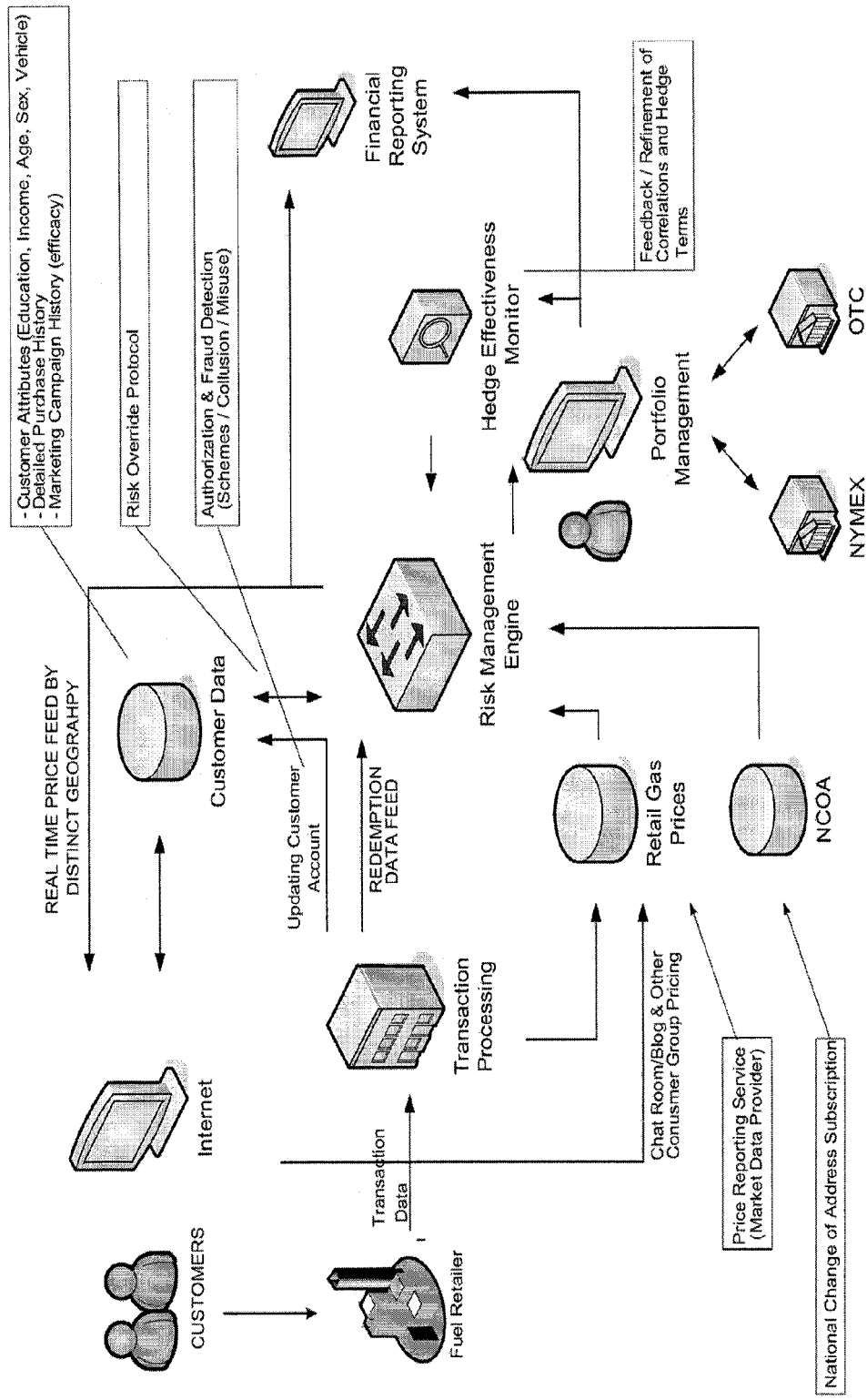
FIG. 11 shows a diagram representing transaction and data flow in an example of a fuel price protection system that incorporates a central risk management engine.

FIG. 11 shows an example of a fuel-price protection that incorporates a risk management system. The system comprises a storage system configured to store: customer data (account) records each comprising an unique account identifier, a credited fuel quantity, and a home geographical region; and retail fuel (shown as gas) price records each comprising an unique region identifier and a posted fuel price for the corresponding region. The system may also have access to a storage system configured to store zip code boundary records that are updated for changes in zip code boundaries (NCOA).

The retail gas price records can be compiled from data received from a transaction processor, data received from a price reporting service or market data provider, and/or data obtained from consumer group sources such as chatrooms and blogs. The risk management engine comprises a processor configured to analyze the retail gas price records and establish a benchmark price for each geographical region, which may then be used to establish a posted price. The risk management engine can contain an interface to send a real time price feed to customers based on the benchmark price or the posted price for each geographic region.

The risk management engine can also monitor customer usage (purchase) patterns by processing the data held in the account records and/or the redemption data feed provided by the transaction processor.

Monitoring and processing retail gas price data and customer data including customer usage (purchase) history is used to manage and modify a portfolio of financial instruments that may be provided by financial institutions such as a bank or a financial exchange, with more specific examples being the NYMEX and over the counter (OTC) markets. The financial instrument may have a valuation that is correlated with a retail price of fuel. The financial instrument may also be acquired based on anticipitated customer usage (purchase) patterns.

The correlation between the financial instruments held in the portfolio and retail fuel prices and/or customer usage (purchase) patterns is monitored by a hedge effectiveness processor. Potential refinements to the portfolio are sent back to the risk management engine.

The system may further comprise a processor to monitor and analyze customer account data to detect fraudulent activity. The system may comprise a module to execute a risk override protocol to freeze or terminate one or more accounts where fraudulent activity has been detected.

The fuel price-protection system, or method for providing the same, described herein may be used by any customer that wishes to purchase quantity units of fuel credits and/or redeem fuel credits at a retail location. Certain customers may be interested in both purchasing and redeeming fuel credits, while others may only execute either a purchase or redemption of fuel credits. Customers include, without limitation, individual consumers, companies that manage vehicle fleets, or companies that sell or lease vehicles. Individual consumers will typically purchase and redeem fuel credits, but may purchase credits and transfer credits to another individual, or may purchase a fuel credit gift card for another individual. Companies that manage fleet vehicles may purchase fuel credits and provide the credits to vehicle drivers for redemption. Retail companies may purchase fuel credit gift cards that could be given to their customers as an incentive for purchasing any retail product, including real estate, vehicles, electronics, furniture, and the like. Companies that sell or lease of vehicle may wish to offer their clients fuel credits for the term of a warranty package or the term of a lease. For example, most car leases provide for a limited allowable annual driving distance, such as 20000 miles, after which charges are applied for any additional distance. The car company may provide their clients with fuel credits to cover the allowable annual driving distance, with the price of the fuel credits for the additional distance being incorporated into the charges for the additional distance. The locked in price of quantity based fuel credits allows for predictability and allows for the cost of fuel t be worked in to the price and terms of a vehicle lease or purchase agreement.

The fuel price-protection system allows the customer to lock-in any desired amount of fuel at a current posted price. Any desired amount of quantity-based fuel credits may be purchased, for example on a website using a credit card or other form of payment. Purchases are credited to the customer's account which are held in quantity units and stored electronically on a host computer. The fuel credits can be stored for any desired time period, for example one, two, three years or even longer. In certain examples, the customer may be provided with the option that the fuel credits may be held with no time expiration. As the customer's price is locked-in at the point of purchase, the operator of the system assumes the risk of fuel prices increasing in the elapsed time between the point of purchase and the point of sale (i.e., redemption of credits). Therefore, the system will typically include a risk management module that can involve, for example, fuel contracts or futures or interest bearing instruments. As a further means of mitigating risk, a service premium will typically be charged to the customer, such that the price to purchase fuel credits will typically be greater than the highest current retail price in a geographic region. The system can optionally include a database of current fuel prices in each geographic region, and can automatically select the highest current fuel price and add a service premium to yield a posted rate that can be presented to the customer. Service premiums may also be charged in respect of other actions carried out by the system, as desired by the operator of the system, for example, for conversion of fuel credits or for renewal of fuel credits for which term is about to expire or has already expired.

The system allows for redemption of fuel credits at retail locations that are connected to the electronically stored information of a customer account or an account linked to a card such as a membership card or a gift card. Account balances can be updated to reflect redemption of credits.

The system includes providing the customer with a unique identifier. The identifier may be an electronic identifier such as a PIN number. The identifier may be a physical identifier such as a bar-coded key tag or bar-coded and/or magnetic striped card. The physical identifier may include a membership card or gift cards. This identifier, combined with the Point of Sale and related internet-based system architecture and infrastructure, allows the customer to redeem all or part of the quantity-based fuel credits at a retail location over time. The customer's account is reduced by the amount of fuel withdrawn in the transaction and the fuel retailer is reimbursed the retailer's price for the fuel at the time of redemption.

The system will allow a customer an option to register an account that is stored in a customer accounts database. The system may also allow a customer an option to purchase a quantity-based gift card (for example, 50 gallons or 50 liters) without the need for registering an account.

The system may comprise a storage system for storing information. The storage system can be implemented as a single data storage device, or as multiple storage devices in combination. Each data storage device can hold one or more databases.

The system may include an option for transfer of fuel credits. The system may allow for transfer of any desired amount of quantity-based fuel credits from a first registered customer to another, the accounts of the registered customers updated to reflect the transfer. The system may also allow for transfer of fuel credits in the form of quantity-based gift cards to registered or unregistered customers, with the account of the registered transferor updated to reflect the transfer. Upon transfer the transferee can redeem any desired amount of the fuel credits at a retail location.

The system may include portability of fuel credits from a first geographic region to another geographic region. A customer that purchases fuel credits in the first geographical region may redeem the fuel credits in any number of selected other geographical regions. The amount of fuel credits can be converted to adjust for price variation in different geographical regions, with convertibility being a function of relative pricing between the different geographical regions. One example of such a conversion is shown in FIG. 1c, where an adjusted account balance is determined as a function of the posted rates of the customer's home region and the geographical region of the retail station. The posted rate is the price at which a motorist may pre-purchase a specific grade of fuel (e.g. 87 octane unleaded gasoline) and may be withdrawn at any eligible station within a specific geographic region. The posted rate may be determined by any criteria as may be desired, for example, to mitigate the risk of increasing fuel prices, to mitigate the cost of operating the price-protection system, to mitigate the risk of holding fuel credits without an expiry date, to profit from sales of fuel credits, and the like. Typically, the posted rate for a fuel in a geographical region will be equal to or greater than the highest price of fuel in the geographical region. Boundaries of geographical regions may be determined by any convenient criteria. One method of setting geographical boundaries is to select a zip or postal code region or group together two or more zip or postal code regions to form a geographical region. In this way, the boundaries of the geographical region are dictated by the boundaries of the selected zip or postal code regions. In some examples, a group of zipcode regions might even make one geographic region an entire county or state. Zip or postal code regions may be grouped according to any convenient criteria, but will typically be grouped based on the disparity in prices from zipcode to zipcode or postal code to postal code. Typically, zip or postal code groupings will attempt to minimize price disparity within a grouped region.

The system can provide alternative approaches to defining a home region that is not restricted to a single zip or postal code or a group of geographically continuous and adjacent zip or postal codes. In certain cases, defining a home region on the basis of a customer's usage or purchasing history or on the basis of a customer's specific choice of eligible retailers may be more suitable and provide a customer with greater convenience than defining a home region on the basis of a single zip or postal code or a group of geographically continuous and adjacent zip or postal codes. A home region based on a customer's usage history and/or a customer's choice of eligible retailers need not be limited by proximate or continuous geography, and in many cases may comprise retail locations within two or more geographically distant or discontinuous zip or postal code regions. Alternatively, a customer's usage history may show and/or the customer may specifically choose a select group of locations, or perhaps even a single location.

Another approach to establishing a customer home region that need not be restricted to a single zip or postal code region is to establish a home region on the basis of a price class. Eligible retailers may be classified according to pump price or pump price ranges. Price-centric classes can be determined as a function of the range of prices (eg, difference between the highest and lowest price) derived from a price database containing fuel prices of eligible retailers in a designated geographic area, for example city, state, country, or continent. Larger price ranges will typically result in more price-centric classes than smaller price ranges Consumers may take advantage of the fuel price-protection system outside their home region due to the regional convertibility function. Using relative values for conversion, consumers can not only be able to access their stored credits within their home region, but may be given the added convenience of seamless convertibility of credits when he/she fills up at a station in another city, state or province.

For example, if a customer owning fuel credits within Region A drove some distance and filled up in Region B, the customer will have a different volume of fuel available for withdrawal in Region B if there is a price differential between the two regions. At this point, the relative values of the current pump prices between the two regions will be compared to adjust the customer's account balance. If the customer drove to a region where the prices are higher, his account balance will be reduced, and conversely, if he drove to a region where prices are lower, then the account balance would increase.

The system may also include a converter for converting the amounts of quantity-based fuel credits to adjust for price differences between different fuels or different grades of fuels, for example different octane rated unleaded gasoline.

The system can provide a price optimizer function that warns or prevents a customer from redeeming fuel credits on the basis of a comparison between a current pump price and pre-set price limit for redemption of fuel credits. Typically, redemption of fuel credits occurs when the pump price is higher than the pre-set price limit. The customer may be provided with the ability to override any warning against or prevention of redemption of fuel credits.

The system provides the customer with the ability to redeem quantity units of fuel credits to purchase fuel. In certain instances, the customer may prefer to purchase fuel without redeeming fuel credits or may have insufficient fuel credits in the customer account to cover all of the fuel purchase. The system can link the customer's account with a secondary payment method. The secondary payment method can include, without limitation, a credit card or monthly billing by the system. A secondary payment method may be used, for example, when redemption of fuel credits is not advisable based on a comparison between a current pump price and a pre-set price limit. A secondary payment method may also be used when insufficient fuel credits remain in a customer's account balance to cover a purchase of fuel.

The fuel price-protection system can include a computer with associated parts, for example, software, memory, processor, display, keyboard, mouse, other input/output devices, printer, etc. The system can also include an interface or connection to a network, for example, to the Internet by which information is received as to purchasers who are entitled to fuel price protection rights, and via which credits may be held and stored, posted price information and other information can be obtained, etc. Also, the computer and/or other parts of the system may be used to obtain information for making judgments as to which risk management instruments to purchase and/or to sell to execute a hedge, and to carry out those purchases and sales. The system can also include an interface or connection to a network that can communicate information to and from user interfaces or data terminals, such as card swipe readers, at retail locations. Still further, the computer may be used to update and maintain databases and update and maintain a website.

The fuel price-protection system may include a website to provide features focusing on convenience, value, and overall consumer experience. For example customers may be provided with access to posted rates of pump prices of all regions. Typically, the customer's home region will be highlighted. The website may also provide information regarding current price range between the highest and lowest price provided by an eligible retailer, and all current price-centric regions along with their respective price limits and corresponding geographical representations, with the customer's home region typically being highlighted.

Posted rates for gift cards as well as member's rates will be clearly visible. Gift card buyers may purchase incremental fuel cards through a standard e-commerce feature. Members may login to access exclusive features such as e-mail alerts when posted pump prices reach a predetermined target.

Other features such as a chat forum for customers may be included. The forum can provide opportunities for users to exchange ideas and comments relating to the common goal of saving money on fuel. Still other features such as fuel cost savings statistics and pricing information may be provided by the website.

Certain information provided at the website may be viewable by those who are receiving the fuel price protection. It is possible that security may be provided so that a customer may only review his or her own records. The records may include information of the average pump price for gasoline of the prescribed octane rating for that customer's automobile in that customer's home geographical region for the immediately closing month, etc. Such average price information may be compared against average posted price information. Still other features will be recognized by the skilled person. Furthermore, while web-based credit card sales of fuel credits have been described, it will be understood that other means of purchase including, for example, telephone sales and direct purchase at retail locations are also feasible.

The system allows customers to purchase bulk quantity reserves of fuel at a posted price and allows customers to lock-in at the posted price until redemption at a retail location connected to electronically stored account for a customer, with the account being adjusted to reflect the redemption. The fuel is purchased as quantity-based fuel credits and these credits may be held within the system for any selected period of time as can be determined by the operator of the system. Typically, the fuel credits may be held for greater than one, two or three years. In certain examples, the fuel credits may be held for any amount of time desired by the customer without expiry. The use of risk management strategies, charging the customer a service premium over the highest retail price at the time of purchase of fuel credits, or a combination thereof, may be particularly useful when the fuel credits are held without a defined expiration date.

In general, redemption of credits in the retail space, for example long distance calling minutes, is not 100%. Customers may forget to use their credits before expiry of credits, and thereby lose the value of the expired credits. For convenience of the customer, the system can include features to protect against the loss of value represent by expired unredeemed credits. For example, the system may allow for fuel credits with no expiry date. For fuel credits having a limited term, the expiry date may be set by the operator of the system as desired. The system may allow the customer the opportunity to renew the term of fuel credits. Fuel credits may be renewed before an expiration date and/or after an expiration date. The system may notify the customer of an imminent expiry date or an expiry date that has recently passed and provide the customer with a limited time period within which to request renewal of the term of the fuel credits that are about to expire or have recently expired. A service premium may be charged for this renewal option as may be determined by the operator of the system. As a further example, the system may provide for conversion of value of expired fuel credits into cash based on the original purchase of the fuel credits, with the customer being provided with the option of a cash refund and/or purchase of fuel credits at a current posted price.

The system allows the customer to lock-in an unlimited volume of fuel at current posted pump prices. These fuel credits may be conveniently bought on a website using a credit card and those same credits, may be conveniently accessed by the customer swiping a physical identifier, such as a membership account card or pre-paid gift card at the pumps, just like a normal debit or credit card transaction.

The customer's account or gift card, is reduced by the amount of fuel withdrawn in the transaction and the fuel retailer is then reimbursed the current retail pump price for the gasoline or diesel.

Account cards may be recharged to any desired volume, while volume-based pre-paid or gift cards may be set in increments of 50 and 100 liters or 15 and 25 gallons, for example.

Cards may be accepted at retailers based on agreements with individual retailers, for example Esso, Shell, PetroCan, or based on use of a facilitator such as a fleet card provider. A facilitator, such as PHH or Wright Express can provide access to about 90-95% off all fuel stations in North America.

In an illustrative example, a fuel price-protection system that enables a customer to redeem quantity-based fuel credits to obtain fuel at a retail location comprise: a host computer comprising ports for receiving and sending data; a database for storing customer account information including an amount of fuel credits; a database for storing posted price for fuel in an eligible geographical region; a converter to adjust the amount of fuel credits stored in the customer account as a function of a price differential between two geographical regions; an identifier associated with each customer account and provided to each customer; a data terminal located at the retail location remote from the host computer and connectable to the host computer for sending data comprising the identifier to the host computer and for receiving a withdrawal approval from the host computer.

In a second illustrative example, a method that provides a customer with fuel price-protection and enables the customer to redeem quantity-based fuel credits to obtain fuel at a retail location comprises: establishing a posted price for a fuel product; charging the customer for purchase of quantity-based fuel credits at the posted price; establishing an identifier associated with the type of purchased product, the amount of purchased fuel credits, and the geographic region of the posted price and providing the identifier to the customer; receiving data from a retailer indicating use of the identifier in a transaction for redemption of fuel credits; determining the number of quantity-based fuel credits available to the customer based on the geographical region of the retailer and/or the fuel grade selected in the transaction; providing the retailer with a withdrawal approval; and reimbursing the retailer for the cost of the transaction.

In a third illustrative example, a computer-based system that provides a customer with fuel price-protection and enables the customer to redeem quantity-based fuel credits to obtain fuel at a retail location comprises: means for establishing a posted price for a fuel product; means for charging the customer for purchase of quantity-based fuel credits at the posted price; means for establishing an identifier associated with the type of purchased product, the amount of purchased fuel credits, and the geographic region of the posted price and providing the identifier to the customer; means for receiving data from a retailer indicating use of the identifier in a transaction for redemption of fuel credits; means for determining the number of quantity-based fuel credits available to the customer based on the geographical region of the retailer and/or the fuel type selected in the transaction; means for providing the retailer with a withdrawal approval; and means for reimbursing the retailer for the cost of the transaction.

In a fourth illustrative example, a computer-based system that provides a customer with fuel price-protection and enables the customer to redeem quantity-based fuel credits to obtain fuel at a retail location comprises: means for establishing an identifier associated with the type of purchased fuel, the amount of purchased fuel credits, and the geographic region of a posted price of the purchased fuel credits and providing the identifier to the customer; means for receiving data from a retailer indicating use of the identifier in a transaction for redemption of fuel credits; means for determining the number of quantity-based fuel credits available to the customer based on the geographical region of the retailer and/or the fuel type selected in the transaction; and means for providing the retailer with a withdrawal approval.

In a fifth illustrative example, a fuel price-protection system that enables a customer to redeem quantity-based fuel credits to obtain fuel at a retail location comprises: a host computer comprising ports for receiving and sending data; a database for storing customer account information including an amount of fuel credits; a database for storing posted price for fuel in an eligible geographical region; a database for storing customer fuel purchasing (usage) history; a converter to adjust the amount of fuel credits stored in the customer account as a function of a price differential between the customer's home geographical region and another geographical region, the customer's home geographic region defined by the customer's usage history; an identifier associated with each customer account and provided to each customer; a user interface (such as a data terminal or card swipe reader) located at the retail location remote from the host computer and connectable to the host computer for sending data comprising the identifier to the host computer and for receiving a withdrawal approval from the host computer.

In a sixth illustrative example, a fuel price-protection system that enables a customer to redeem quantity-based fuel credits to obtain fuel at a retail location comprises: a host computer comprising ports for receiving and sending data; a database for storing customer account information including an amount of fuel credits and a pre-set price limit for controlling redemption of fuel credits; a database for storing posted price for fuel in an eligible geographical region; a converter to adjust the amount of fuel credits stored in the customer account as a function of a price differential between two geographical regions; an identifier associated with each customer account and provided to each customer; a user interface (such as a data terminal or card swipe reader) located at the retail location remote from the host computer and connectable to the host computer for sending data comprising the identifier to the host computer and for receiving a withdrawal approval from the host computer; the host computer comprising a module for comparing the price of fuel selected at the retail location with the pre-set price limit and allowing redemption of fuel credits to proceed if a price associated with the fuel selected (such as the current price of the retailer or the posted price of the geographical region of the retailer) is higher than the pre-set price limit.

In a seventh illustrative example, a fuel price-protection system that enables a customer to redeem quantity-based fuel credits to obtain fuel at a retail location, the system comprising: a host computer comprising ports for receiving and sending data; a database for storing customer account information including an amount of fuel credits; a database for storing posted price for fuel in an eligible price-centric class; a converter to adjust the amount of fuel credits stored in the customer account as a function of a price differential between two price-centric classes; an identifier associated with each customer account and provided to each customer; a user interface (such as a data terminal or card swipe reader) located at the retail location remote from the host computer and connectable to the host computer for sending data comprising the identifier to the host computer and for receiving a withdrawal approval from the host computer.

In an eighth illustrative example, a fuel price-protection system that enables a customer to redeem quantity-based fuel credits to obtain fuel at a retail location comprises: a host computer comprising ports for receiving and sending data; a database for storing customer account information including an amount of fuel credits and one or more expiry dates for the fuel credits; an interface configured to notify a customer of fuel credit expiry before and/or after the expiry date and to provide the customer with the option to receive a refund or to renew the expired fuel credits; a database for storing posted price for fuel in an eligible geographical region; a converter to adjust the amount of fuel credits stored in the customer account as a function of a price differential between two geographical regions; an identifier associated with each customer account and provided to each customer; a a user interface (such as a data terminal or card swipe reader) located at the retail location remote from the host computer and connectable to the host computer for sending data comprising the identifier to the host computer and for receiving a withdrawal approval from the host computer.

The fuel price-protection method and system described herein provides the customer with a convenient mechanism for making an advanced purchase of a quantity of fuel at a posted price at the time of the purchase. Any fuel type may be purchased including, without limitation, diesel, gasoline, hydrogen, ethanol, jet fuel, natural gas, heating oil, or any grade of these fuels. Purchases are credited to the customer's account which is held in quantity units and stored electronically on a host computer. Since the credited fuel quantity has been pre-purchased at a locked-in price, all fuel credits in the account are stored in quantity units, thus allowing redemption of fuel credits to circumvent the market price ruling at the point of sale (redemption). The system thus provides a convenient way for the customer to hedge against future volatility, and particularly, increases of fuel prices.

The method and system described herein may be embodied in a software application including computer executable instructions executed by a processing unit such as a personal computer, a digital video recorder, or other computing system environment. The software application may run as a stand-alone application or may be incorporated into other available applications to provide enhanced functionality to those applications. The software application may include program modules including routines, programs, object components, data structures etc. and may be embodied as computer readable program code stored on a computer readable medium. The computer readable medium is any data storage device that can store data, which can thereafter be read by a computer system. Examples of computer readable media include for example read-only memory, random-access memory, CD-ROMs, magnetic tape and optical data storage devices. The computer readable program code can also be distributed over a network including coupled computer systems so that the computer readable program code is stored and executed in a distributed fashion.

The above detailed description solely for purposes of illustration and is not intended to limit the scope of the claims. Changes in form and substitution of equivalents are contemplated as circumstances may suggest or render expedient. Although specific terms have been employed herein, such terms are intended in a descriptive sense and not for purposes of limitation. As described herein in the context of the price-protection system terms, such as, fuel, gasoline, gas, diesel fuel, oil, etc., may be used; generally these terms are used equivalently and interchangeably unless otherwise specifically indicated or indicated by context. Further, terms, such as, consumer, customer, client, buyer etc., may be used; in general these terms are used equivalently and interchangeably unless otherwise specifically indicated or indicated by context. Also, although the price-protection system is described with respect to fuel, it will be appreciated that fuel is a consumable and the price-protection system may be used in connection with other consumables.

What is claimed is:

1. A system for approving or denying customer requests to withdraw fuel from retail locations, comprising:
a storage system configured to store:
account records each comprising an unique account identifier, a credited fuel quantity, and a price-centric retailer class associated with the credited fuel quantity; and
price records each comprising an unique price-centric retailer class identifier and a posted fuel price for the corresponding price-centric retailer class;
an electronic interface device connected to a network configured to receive customer withdrawal requests via retail locations over a network, wherein each withdrawal request comprises an account identifier and information for determining a price-centric retailer class of the retailer location;
a processor coupled to the storage system and the interface;
the processor configured to approve or deny each withdrawal request based on credited fuel quantity in the account record corresponding to the account identifier in the withdrawal request and any differential between the posted fuel price corresponding to the price-centric retailer class of the retailer and the posted fuel price corresponding to the price-centric retailer class associated with the credited fuel quantity, wherein each price-centric retailer class designates a price range segment of a fuel price range of retail locations and the price range segments of a plurality of price-centric retailer classes together substantially cover the fuel price range, and wherein a withdrawal approval or denial is returned over the network to the respective retail location in response to each withdrawal request.

2. The system of claim 1, further comprising a database for storing eligible fuel retailers, wherein each eligible fuel retailer is associated with a price-centric retailer class.

3. The system of claim 1, further comprising a database for storing a plurality of current retail fuel prices in each price-centric retailer class.

4. The system of claim 1, further comprising a financial account for holding risk management instruments.

5. The system of claim 1, further comprising:
a converter for adjusting the credited fuel quantity as a function of the differential.

6. The system of claim 1, wherein the storage system is also configured to store usage records each comprising a retailer location identifier and fuel type and quantity of fuel withdrawn at the retailer location.

7. The system of claim 6, wherein the price-centric retailer class associated with the credited fuel quantity is based on the usage record information.

8. The system of claim 7, wherein the storage system is also configured to store a pre-set price limit for controlling redemption of the credited fuel quantity.

9. A method for approving or denying a customer request to withdraw fuel from a retail location, comprising:
storing account records in a storage system, each account record comprising an unique account identifier, a credited fuel quantity, and a price-centric retailer class associated with the credited fuel quantity;
storing price records in the storage system, each price record comprising an unique price-centric retailer class identifier and a posted fuel price for the corresponding price-centric retailer class;
receiving via an electronic interface device over a network, a customer withdrawal request via the retail location comprising an account identifier and information for determining the price-centric retailer class of the retailer location;
in response to the withdrawal request, returning over the network one of a withdrawal approval and a withdrawal denial determined by a processor based on the credited fuel quantity in the account record corresponding to the received account identifier and any differential between the posted fuel price corresponding to the price-centric retailer class of the retailer and the posted fuel price corresponding to the price-centric retailer class associated with the credited fuel quantity;
wherein each price-centric retailer class designates a price range segment of a fuel price range of retail locations and the price range segments of a plurality of price-centric retailer classes together substantially cover the fuel price range.

10. The method of claim 9, wherein the withdrawal approval comprises a withdrawal limit.

11. The method of claim 9, further comprising acquiring a financial instrument, wherein the financial instrument has a valuation that is correlated with the retail price of the fuel product.

12. The method of claim 9, wherein the determining the credited fuel quantity available for a transaction comprises adjusting the number of available quantity-based fuel credits to reflect a price differential between the posted fuel price corresponding to the price-centric retailer class of the retailer and the posted fuel price corresponding to the price-centric retailer class associated with the credited fuel quantity.

13. The method of claim 9, further comprising storing the customer's usage information comprising the retailer location identifier and fuel type and quantity of fuel withdrawn at the retailer location.

14. The method of claim 13, further comprising determining the price-centric retailer class associated with the credited fuel quantity based on the usage information.

15. The method of claim 14, further comprising storing a pre-set price limit for controlling redemption of the credited fuel quantity.

16. A non-transitory computer readable medium embodying a computer program for approving or denying a customer request to withdraw fuel from a retail location, the computer program when executed by a processor, executing steps comprising:
computer program code for storing account records each comprising an unique account identifier, a credited fuel quantity, and a price-centric retailer class associated with the credited fuel quantity;
computer program code for storing price records each comprising an unique price-centric retailer class identifier and a posted fuel price for the corresponding price-centric retailer class;
computer program code for receiving a customer withdrawal request via the retail location comprising an account identifier and information for determining the price-centric retailer class of the retailer location;
computer program code for, in response to the withdrawal request, returning one of a withdrawal approval and a withdrawal denial based on the credited fuel quantity in the account record corresponding to the received account identifier and any differential between the posted fuel price corresponding to the price-centric retailer class of the retailer and the posted fuel price corresponding to the price-centric retailer class associated with the credited fuel quantity;
wherein each price-centric retailer class designates a price range segment of a fuel price range of retail locations and the price range segments of a plurality of price-centric retailer classes together substantially cover the fuel price range.

17. The computer readable medium of claim 16, wherein the withdrawal approval comprises a withdrawal limit.

18. The computer readable medium of claim 16, further comprising computer program code for acquiring a financial instrument, wherein the financial instrument has a valuation that is correlated with the retail price of the fuel product.

19. The computer readable medium of claim 16, further comprising computer program code for storing the customer's usage information comprising the retailer location identifier and fuel type and quantity of fuel withdrawn at the retailer location.

20. The computer readable medium of claim 19, further comprising computer program code for determining the price-centric retailer class associated with the credited fuel quantity based on the usage information.

21. The computer readable medium of any one of claim 20, further comprising computer program code for storing a preset price limit for controlling redemption of the credited fuel quantity.

22. The computer readable medium of claim 16, wherein the computer readable medium is a data storage device.

23. A system for approving or denying a customer request to withdraw fuel from a retail location, comprising:

means for storing account records each comprising an unique account identifier, a credited fuel quantity, and a price-centric retailer class associated with the credited fuel quantity;

means for storing price records each comprising an unique price-centric retailer class identifier and a posted fuel price for the corresponding price-centric retailer class;

means for receiving over a network a customer withdrawal request via the retail location comprising an account identifier and information for determining the price-centric retailer class of the retailer location;

in response to the withdrawal request, means for returning over the network one of a withdrawal approval and a withdrawal denial based on the credited fuel quantity in the account record corresponding to the received account identifier and any differential between the posted fuel price corresponding to the price-centric retailer class of the retailer and the posted fuel price corresponding to the price-centric retailer class associated with the credited fuel quantity;

wherein each price-centric retailer class designates a price range segment of a fuel price range of retail locations and the price range segments of a plurality of price-centric retailer classes together substantially cover the fuel price range.

* * * * *